(12) United States Patent
Williamson et al.

(10) Patent No.: US 7,894,950 B2
(45) Date of Patent: Feb. 22, 2011

(54) METHODOLOGY FOR AUTONOMOUS NAVIGATION AND CONTROL OF A TETHERED DROGUE

(75) Inventors: Walton Ross Williamson, Burbank, CA (US); Jason Lee Speyer, Los Angeles, CA (US)

(73) Assignee: Sysense, Inc., El Segundo, CA (US)

( * ) Notice: Subject to any disclaimer, the term of this patent is extended or adjusted under 35 U.S.C. 154(b) by 0 days.

(21) Appl. No.: 12/832,849

(22) Filed: Jul. 8, 2010

(65) Prior Publication Data

US 2010/0274444 A1 Oct. 28, 2010

Related U.S. Application Data

(63) Continuation of application No. PCT/US2009/030945, filed on Jan. 14, 2009.

(60) Provisional application No. 61/021,299, filed on Jan. 15, 2008.

(51) Int. Cl.
G05D 1/08 (2006.01)
(52) U.S. Cl. .................. 701/34; 701/4; 244/135 A
(58) Field of Classification Search .................. 701/34, 701/4; 344/135 A; 442/135 A
See application file for complete search history.

(56) References Cited

U.S. PATENT DOCUMENTS

| | | | | |
|---|---|---|---|---|
| 5,326,052 A * | 7/1994 | Krispin et al. | .......... | 244/135 A |
| 6,604,711 B1 * | 8/2003 | Stevens et al. | .......... | 244/135 A |
| 6,786,455 B1 * | 9/2004 | Bartov | .......... | 244/135 A |
| 7,275,718 B2 | 10/2007 | Saggio, III et al. | | |
| 2005/0045768 A1 * | 3/2005 | Saggio et al. | .......... | 244/135 A |
| 2005/0114023 A1 * | 5/2005 | Williamson et al. | .......... | 701/214 |
| 2005/0269456 A1 * | 12/2005 | Saggio et al. | .......... | 244/135 A |
| 2006/0065785 A1 * | 3/2006 | Enig et al. | .......... | 244/135 A |
| 2006/0271249 A1 * | 11/2006 | Testrake et al. | .......... | 701/3 |
| 2006/0284019 A1 * | 12/2006 | Takacs et al. | .......... | 244/135 A |
| 2007/0221790 A1 * | 9/2007 | Goossen et al. | .......... | 244/53 B |
| 2007/0252035 A1 * | 11/2007 | Hubbard, Jr. | .......... | 244/75.1 |
| 2007/0262203 A1 * | 11/2007 | Saggio et al. | .......... | 244/135 A |
| 2008/0027593 A1 * | 1/2008 | Saggio et al. | .......... | 701/3 |
| 2008/0054124 A1 * | 3/2008 | Takacs et al. | .......... | 244/135 A |
| 2008/0075467 A1 * | 3/2008 | Mickley et al. | .......... | 398/131 |
| 2008/0128561 A1 * | 6/2008 | Hyde et al. | .......... | 244/204 |
| 2008/0265097 A1 * | 10/2008 | Stecko et al. | .......... | 244/135 A |
| 2010/0001124 A1 * | 1/2010 | Feldmann | .......... | 244/58 |
| 2010/0108815 A1 * | 5/2010 | Stecko et al. | .......... | 244/135 A |
| 2010/0185344 A1 * | 7/2010 | Roach | .......... | 701/4 |

OTHER PUBLICATIONS

International Search Report for Serial No. PCT/US2009/030945 dated Jul. 31, 2009.

* cited by examiner

*Primary Examiner*—Khoi Tran
*Assistant Examiner*—Brian J Broadhead
(74) *Attorney, Agent, or Firm*—Michael Blaine Brooks, PC; Michael B. Brooks

(57) ABSTRACT

Methods and devices for estimating and controlling the orientation of a drogue relative to air mass motion where method and apparatus embodiments incorporate estimation of angle of attack and sideslip and function to correct the direction of a drogue so as to maintain a desired angle of attack and sideslip. Some of the exemplary estimation techniques apply methods of sensor output fusion.

12 Claims, 19 Drawing Sheets

METHODOLOGY FOR AUTONOMOUS NAVIGATION AND CONTROL OF A TETHERED DROGUE

This application is a continuation of International Application No. PCT/US2009/030945 filed Jan. 14, 2009, which claims the benefit of U.S. Provisional Patent Application Ser. No. 61/021,299 filed Jan. 15, 2008, the disclosures of which are incorporated herein by reference in their entirety for all purposes.

TECHNICAL FIELD

The present invention, in its several embodiments, pertains to methods and devices for estimating and controlling the attitude of a drogue relative to air mass motion where method and apparatus embodiments incorporate estimation of angle of attack and sideslip and function to correct the direction of a vehicle so as to maintain a desired angle of attack and sideslip and, in addition, some of the exemplary estimation techniques apply methods of sensor output fusion.

BACKGROUND

Aerodynamic stabilization of a refueling boom may be effected via a drogue chute. A refueling boom having one or more control surfaces may be controlled relative to a target via adjustments to the one or more control surfaces. Autonomous refueling via a refueling boom within a system comprising electro-optical, inertial, and global positioning system sensor fusion has been proposed in U.S. Patent Application Publication No. US2008/0270027 A1 and US Patent Application Publication No. US2008/0265097 A1. The bringing together of the distal end of a refueling boom of a first air vehicle with an intake port of another air vehicle may be treated as an intercept problem and intercept approaches include the application of a linear-quadratic Guassian differential game, such as U.S. patent application Ser. No. 11/428,785 to Chen et al.

SUMMARY

A new method for estimation and controlling an aerodynamic body relative to air mass motion is disclosed. The method in its several embodiments, estimates the alignment with the air mass motion which may be utilized to provide feedback control to maintain a desired angle of attack, sideslip, and/or Mach number. A control law cost function and methodology is developed by example. Provisions are included as options for the estimation of attitude.

Exemplary embodiments include a computer-implemented method for navigation and control of an air or water vehicle relative to fluid motion comprising: (a) measuring fluid pressure at multiple stations around a shape comprising at least one pressure sensor; (b) estimating the vehicle orientation relative to the air mass motion using the output of the at least one pressure sensor; (c) generating a feedback command designed to maintain the vehicle orientation relative to air mass motion; and (d) generating the at least one feedback command based on a minimized cost function, the cost function based on the estimated vehicle orientation based on the at least one pressure measurement. The computer-implemented method may include: estimating the health in each of the pressure sensors, estimating the probability of a failure in each pressure sensor in use, and outputting this probability to a fault detection processing module embodied as either a computer-executable instruction on a computing device, a circuit, or device embodying a combination of structures. The fault detection processing module may apply a least squares estimation method coupled with a Multiple Hypothesis Shiryayev Sequential Probability Ratio Test (MHSSPT) or a least squares estimation method coupled with the Chi-Square Test.

The computer-implemented method may include: (a) computer-executable instructions representative of the effective forces and moments that would be expected to be generated by at least one of the real world vehicle actuators; and (b) at one or more particular time ticks, reading and/or estimating deflections and/or travel excursions and/or positions of the one or more real world actuators relative to a reference body of the air vehicle. For example, an air vehicle digital processor, circuitry, or combinations of both, may process the at least one actuator measurement through the at least one estimation processing instructions and vehicle model, represented in computer instructions, that integrate the forces and moments and fuse the resulting state with the output of the at least one pressure sensor to generate a state estimate and provide at least one feedback command based on the updated estimate.

The processing step of generating an updated state estimate and outputting a least one feedback command based on the updated estimate may further include one or more steps for detecting a failure of the at least one real world actuator. For example, in order to estimate the probability of a failure in the at least one actuator, after receiving a plurality of sensors measurements and actuator commands, a processor may be used to execute computer instructions representative of a fault detection model. The exemplary processor may be loaded with instructions for fault detection that cause the processor to take in accelerometer measurements and then, coupled with instructions of a signal output projector, a test such as the Multiple Hypothesis Shiryayev Sequential Probability Ratio Test (MHSSPRT) or Chi-Square Test may be applied. The exemplary processor may be loaded with instructions for fault detection that cause the processor to execute one or more fault detection filter structures represented by computer instructions and then, coupled with instructions of a signal output projector, a test such as the MHSSPRT or Chi-Square Test may be applied.

In some embodiments, the computer-implemented methods may include the processing taking in at least one angular velocity measurement that is subjected to at least one set of computer instructions that estimates vehicle forces and moments and fuses the resulting one or more states with the output of the at least one pressure sensor. The exemplary processor may further configured by including instructions for applying a plurality of measurements to computer-executable instructions representative of a fault detection filter and generating a probability value representative of the expectation of a gyro fault having occurred. For example, the processor may execute computer-executable instruction of a fault detection filter that blocks the processing of detected and/or predicted gyro failures, e.g., blocking the process of one or more gyros based on the generated probability value. The fault detection instructions executed to generate the probability of a failure may be instructions that are representative of MHSSPRT or Chi-Square Test. In some embodiments, the computer-implemented method may further include computer-executable instructions including at least one accelerometer measurement in the execution of instructions for estimating the vehicle forces and moments and fusing the resulting state with the output of the at least one pressure sensor. The instructions representative of a fault detection filter may block accelerometer failures from entering and corrupting the general estimation and control process. For example, the processor may execute a plurality of measurements, including accelerometer measurements, through the fault detection filter, and generate a probability that a failure in the accelerometer has occurred. Based on a probability threshold associated with the particular accelerometer, the processor may execute instructions to block the accelerometer measurement values as input to the estimation and control process. The fault detection filter may generate the probability of accelerometer failure based on a MHSSPRT or Chi-Square Test. The processor may execute instructions that take in multiple accelerometer measurements and execute instructions representative of a projector to detect the likely failure, e.g., via a probabilistic threshold, and isolate the likely failure, e.g., via blocking instructions.

Embodiments of the present invention may include a processor and/or circuitry configured to take in signals from at least one Global Position System (GPS) receiver device. For example, air vehicle position and velocity may be available to the processor from such a device. The processor may take in one or more position and/or velocity measurements to refine estimated vehicle state and fuse the resulting state with the output of the at least one pressure sensor. The processor may execute instructions of a fault detection filter that estimates whether a GPS failure has likely occurred and, if so, to block the GPS-related measurements from the vehicle estimation process and particularly the control process. The probability value that a failure of the GPS receiver device may be based on a MHSSPRT or Chi-Square Test.

Some embodiments of the present invention may further include at least one data link device for receiving vehicle state data from one other vehicle where additional processing instructions may represent a control law for guiding the air vehicle to hold an offset relative to the one or more vehicles that may be the sources of information via the one or more data links. That is, the air vehicle processor may generate an estimate of the relative state between the vehicle and the at least one other vehicle based on the data from the at least one data link, and generate a command to maintain an offset relative to the vehicle providing the data, and perhaps other vehicles, e.g., depending on the data provided. The exemplary form of relative navigation may include the processor executing one or more instructions representative of a control law that blocks uncertainties in the relative states that cannot be estimated well or controlled well with the current control system. i.e., the processor may execute instructions of a "blocking filter" in order to provide the feedback guidance command. In some embodiments, the air vehicle and the second vehicle may be tethered to one another. For example, the air vehicle may be an aerial refueling drogue attached, via a hose/reel system, to the second vehicle that may be an aerial fuel tanker. In some embodiments, the air vehicle may be an air speed drag device, e.g., a parachute. In some embodiments, the air vehicle may be a sonar buoy dragged behind a ship.

DETAILED DESCRIPTION

1. Overview

Generally, the invention in its several embodiments, includes methods for characterizing, analyzing, and displaying the uncertainty in a particular set of measurements. For example, an exemplary system or device embodiment of the invention may provide a means of estimating the relative attitude of an air vehicle relative to air mass motion and then to align the vehicle with the steady state air mass motion. To do this, a set of pressure sensors, or conduits to a single sensor with selectable access to each conduit, may be attached or otherwise disposed at various locations around and about the air vehicle. The difference in pressure at each location is derived to determine a pressure gradient. An exemplary control system of the overall system has several goals including a goal to drive the pressure gradient from the current, i.e., measured, gradient to the desired gradient through the use of automatic feedback control techniques that may include measurement signal gains and signal path summations and differences. Embodiments of the present invention may have applications as sub-system portion within systems such as, but not limited to, control systems for aerial refueling drogues, systems for flying unmanned aerial vehicles (UAVs) at a maximum Lift-to-Drag Ratio, and systems for operating boats in an autonomous manner for energy management.

Figure 1:
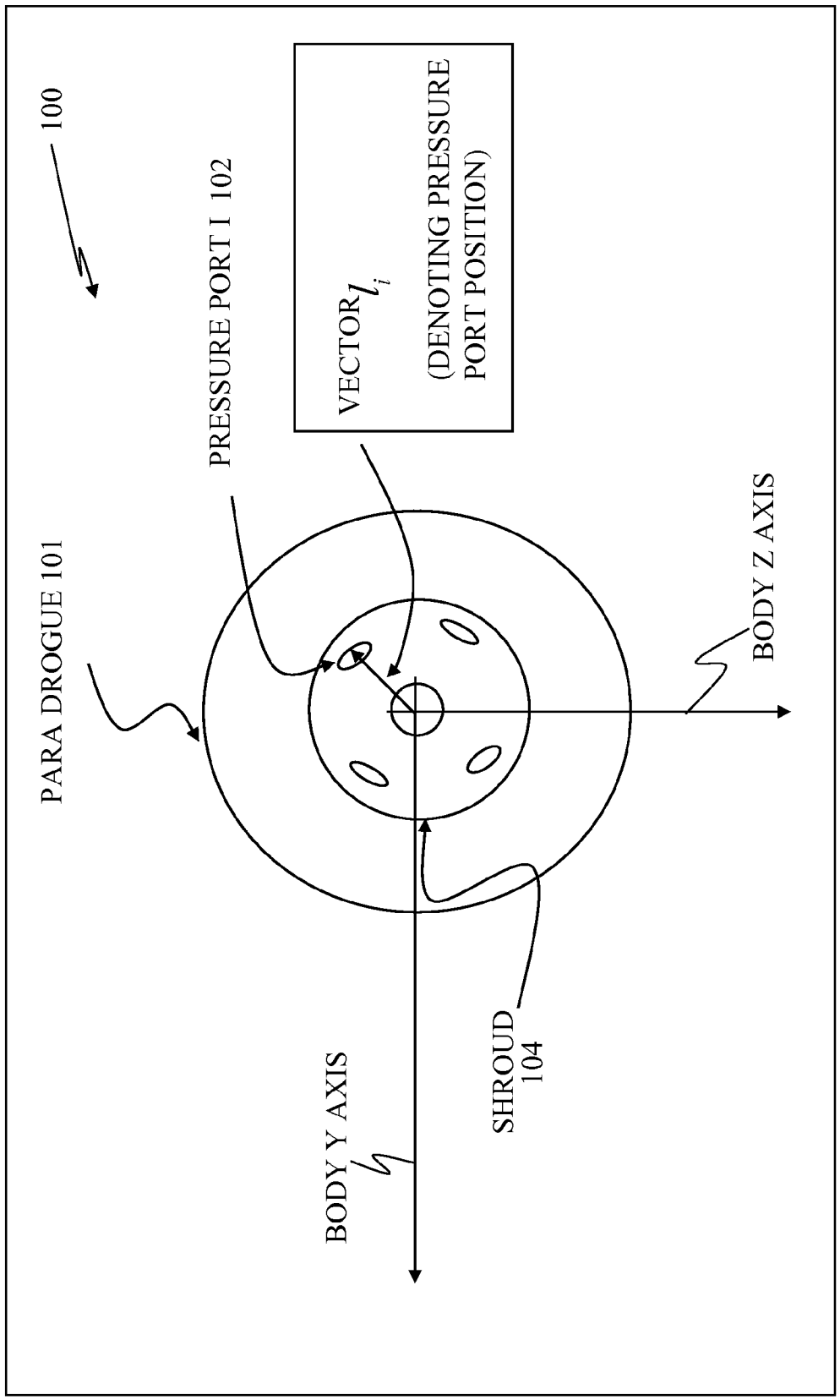
FIG. 1 is a front view of a drogue.
Figure 2:
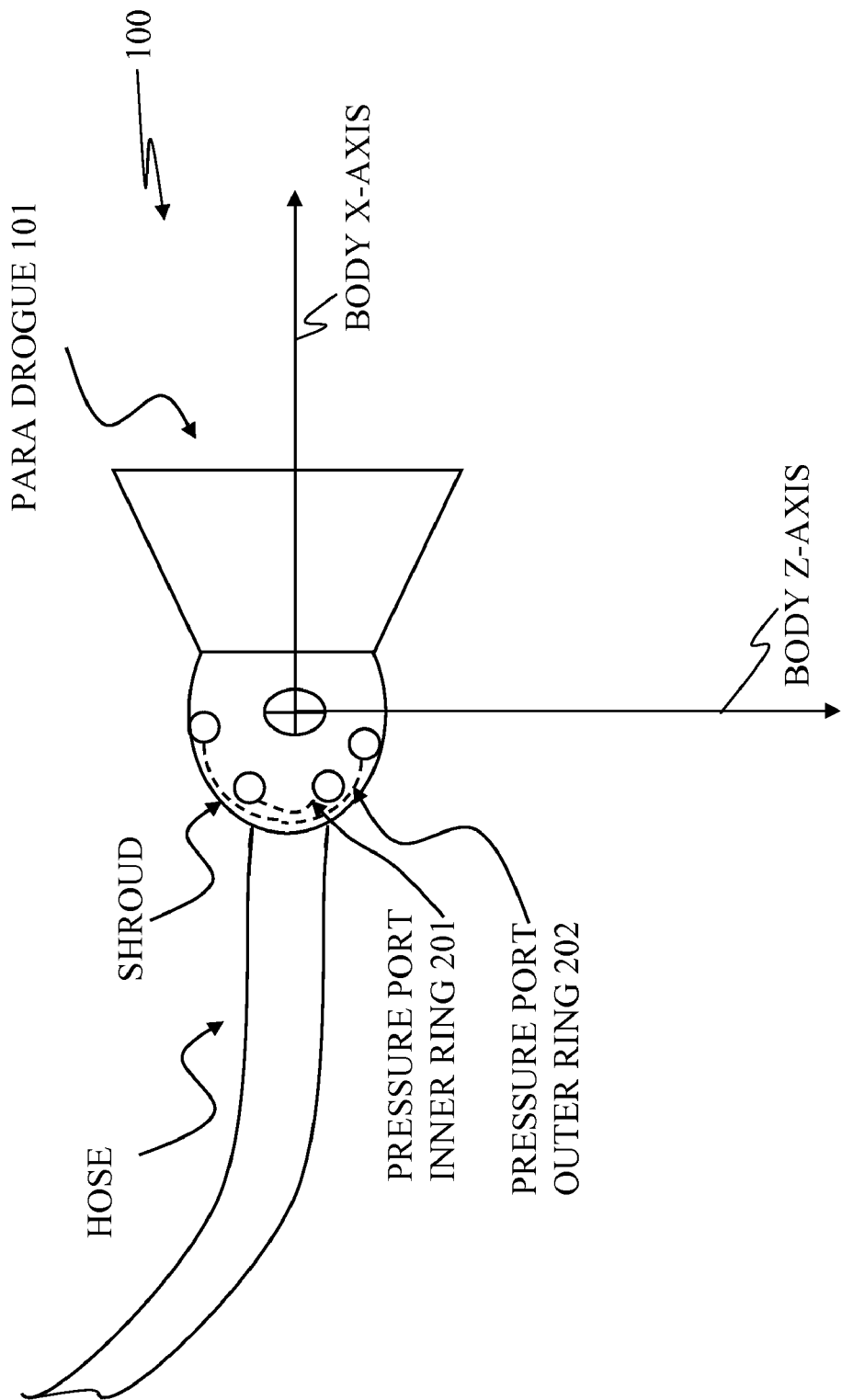
FIG. 2 is a side view of a drogue.
Figure 3:
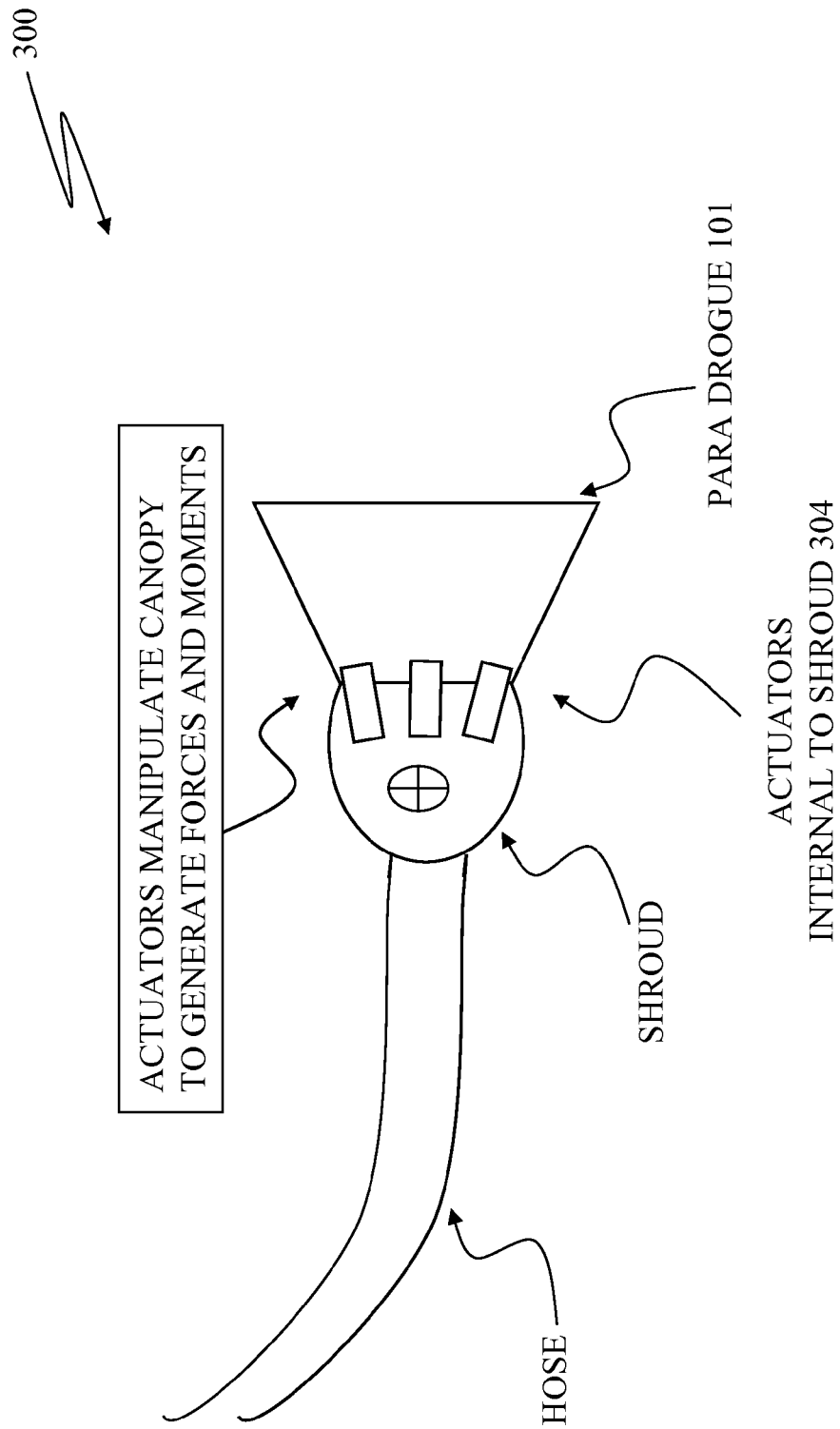
FIG. 3 is an example of an exemplary actuator configuration.
Figure 4:
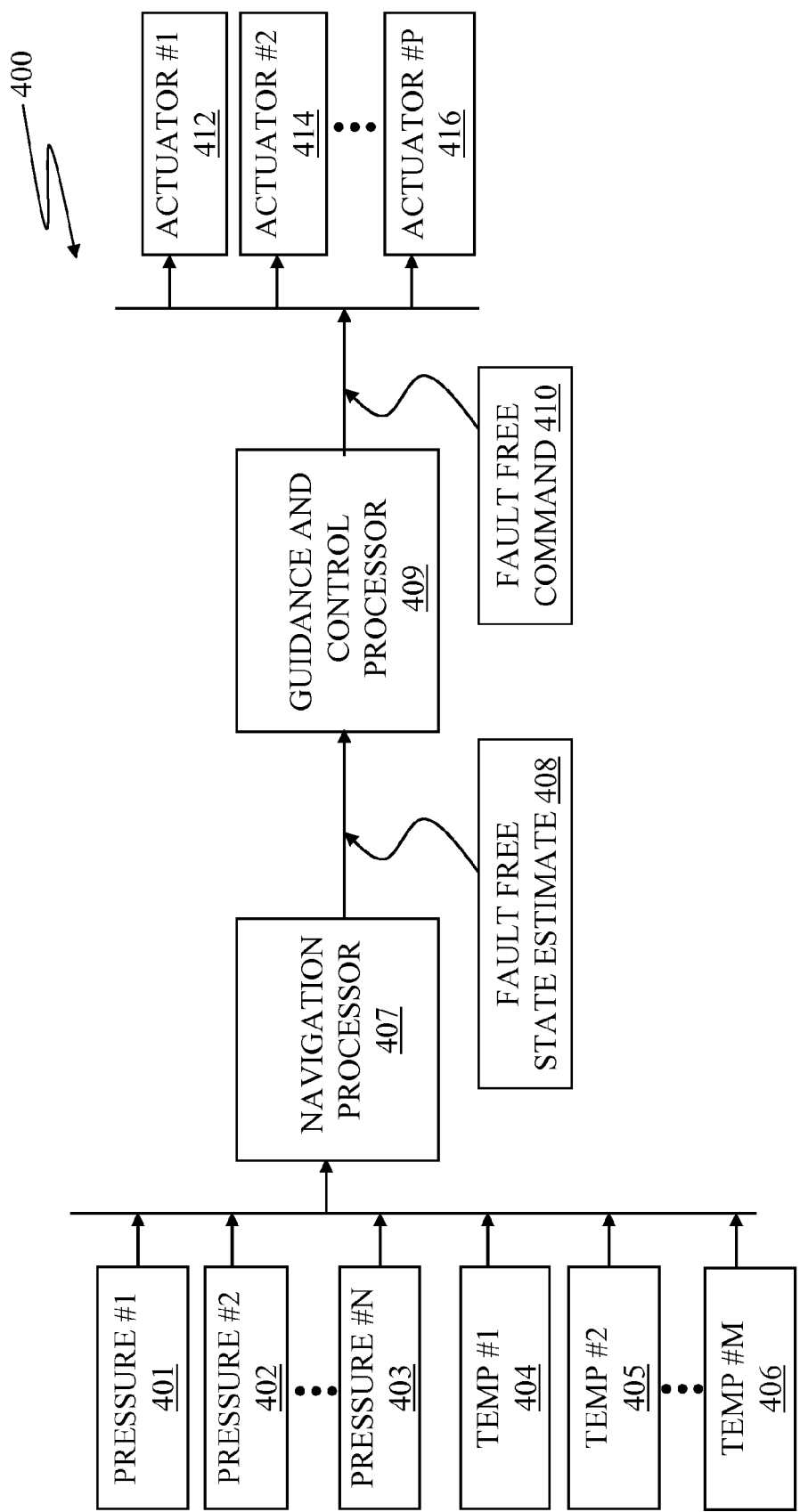
FIG. 4 is a functional block diagram showing feedback configuration with air data for an embodiment of the invention.
Figure 5:
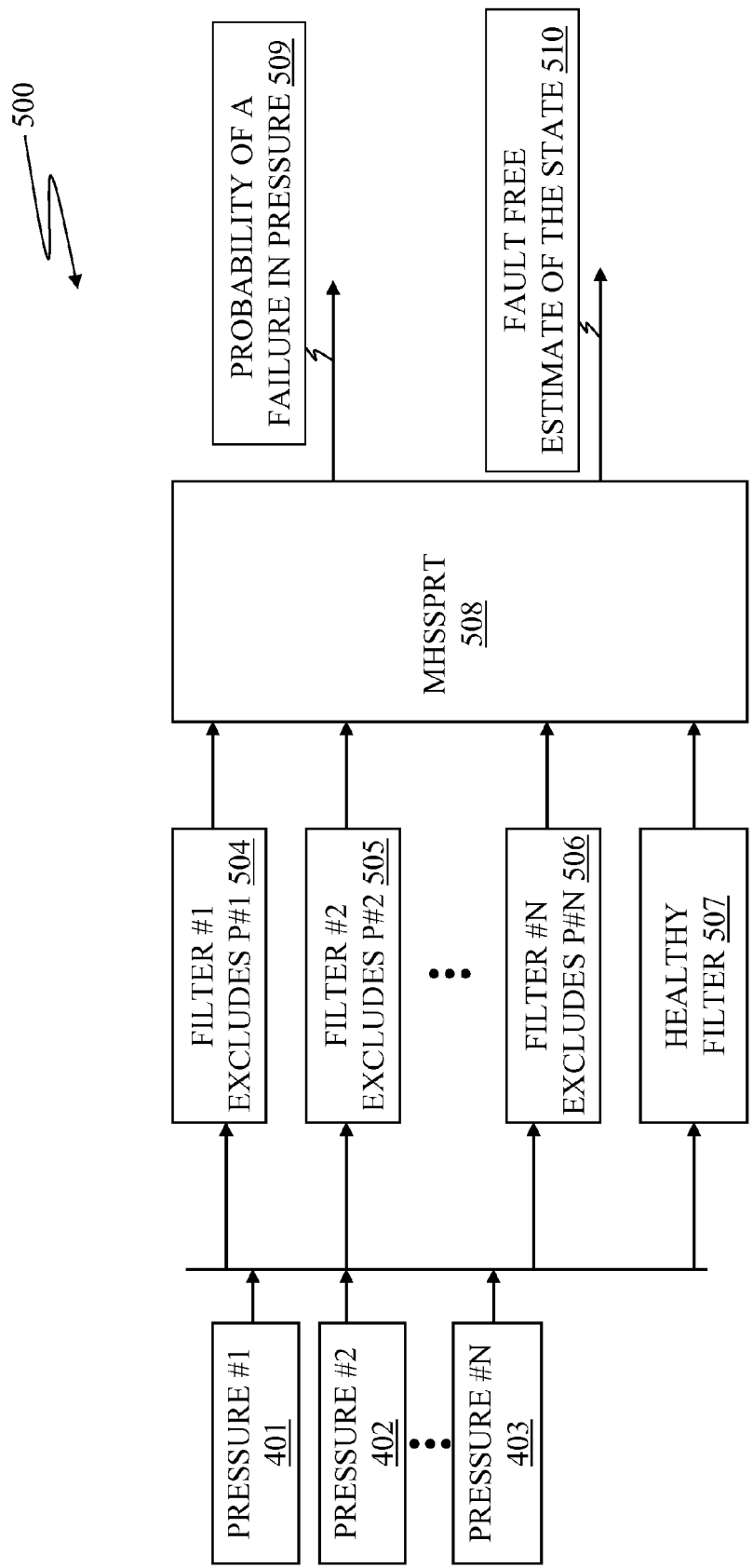
FIG. 5 is an exemplary functional block diagram of a fault tolerant navigation system.
Figure 6:
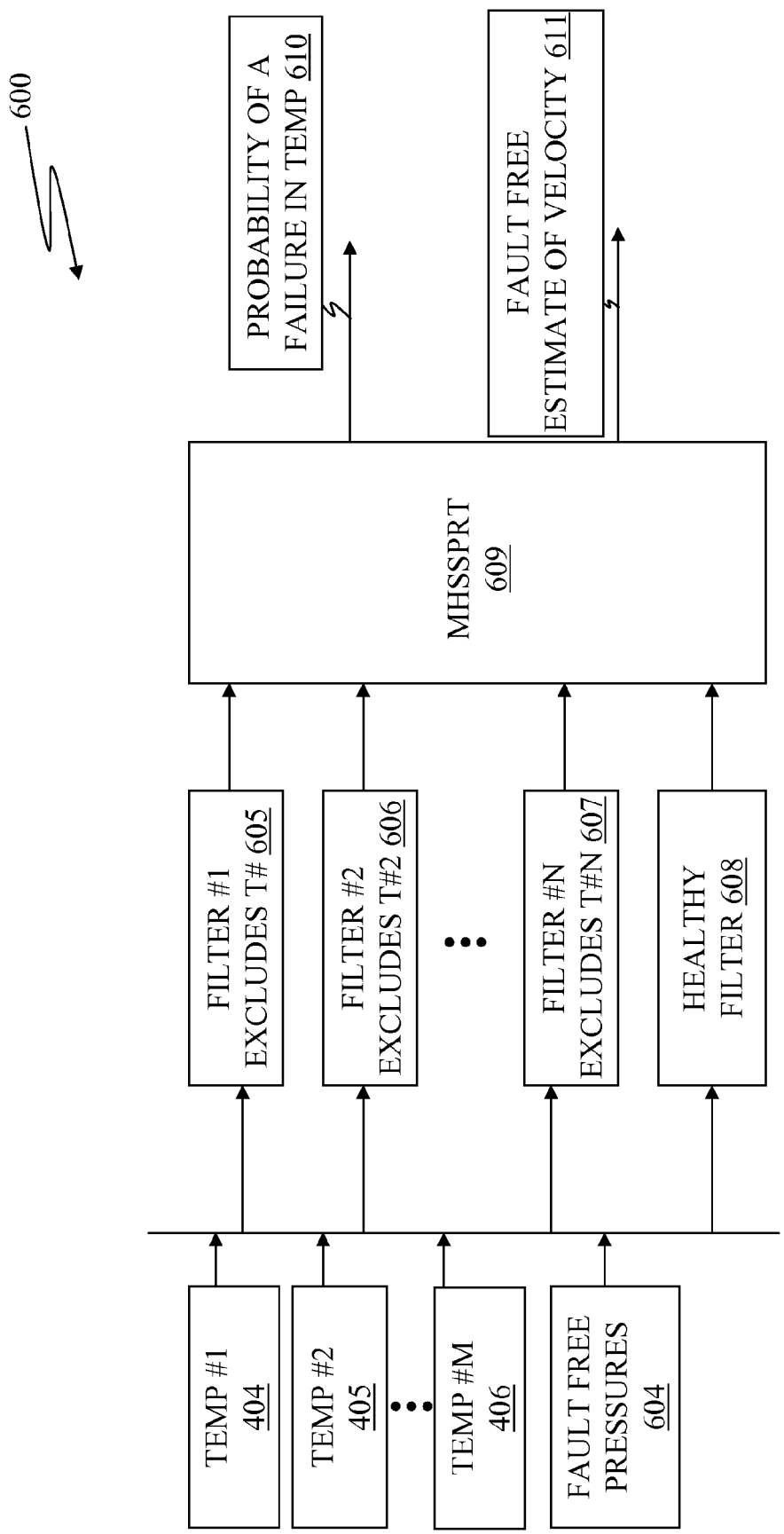
FIG. 6 is an exemplary functional block diagram of a fault tolerant navigation system with pressure and temperature sensors.

FIGS. 1, 2, 3, and 4 present the problem in which a drogue is controlled by estimating a fault free state using pressures sensors which are then used to feedback the control on the drogue. In FIG. 1, a drogue 100 has pressure sensors 102 disposed about the circumference of the shroud 104 at known locations measuring air pressure. In FIG. 2, the side view of a drogue 100 is shown in which multiple locations of pressure sensor taps 201, 202 are measured around the shroud. In FIG. 3, actuators 304 on the paradrogue portion 101 of the drogue 300 manipulate the canopy and generate forces and moments on the drogue. FIG. 4 shows a functional block diagram for one embodiment in which a set of pressure sensors 401-403 and temperature sensors 404-406 measuring the pressure and temperature at different locations are fused together through a fault tolerant estimation process from a navigation processor 407 in order to estimate the velocity, altitude, and orientation of the drogue. This information as a fault free state estimate 408 is then sent to a guidance and control law processor 409 which attempts to steer with a fault free command 410 the drogue in the direction of the wind mass or in the direction of a desired offset from the current wind state via actuators 412, 414, 416. FIG. 5 shows the development of the fault tolerant navigation system 500 in which only pressure sensors 401-403 are utilized and passed through a set of sensor fusion processes. The Multiple Hypothesis Shiryayev Sequential Probability Ratio Test (MHSSPRT) 508 calculates the probability that a failure 509 has occurred as well as selecting the best estimate to pass onto the control system 510. FIG. 6 shows a similar format of fault tolerant navigation for pressure and temperature sensors 600. Many other combinations of structures and sensors are possible and build upon the basic framework.

2. Instrumentation

In this section, the instruments defined for an exemplary drogue system are detailed and several exemplary methods for generating the required information are defined.

2.1 Air Data

In this section, a series of static pressure sensors 102 are attached at various points along the wall of the drogue 100 as depicted in FIG. 1. A goal of the configuration may be to measure the relative air pressure at different points along the surface facing the air stream. Then the control system compensates by generating a force in order to maintain a constant pressure around the ring.

Pressures sensors are ordered from 1 to N. The pairs may be ordered symmetrically or a-symmetrically. In one example, they all face into the primary air stream. The velocity of the air mass motion relative to the inertial frame is defined in the local tangent (North-East-Down,NED) frame as $V_A^{NED}$. The inertial velocity of the lifting body is defined as $V_B^{NED}$ in the local tangent frame. The relative velocity between the body and the air mass is defined as the difference between the two velocities or $V_{AB}^{NED} = V_B^{NED} - V_A^{NED}$. The relative vector velocity can be written in the body frame as well as the NED frame. The body frame is defined using the right-hand-rule and having the x axis through the front of the body, the y axis to starboard and the z axis pointed to the bottom of the body. In the body frame, the coordinates are defined as:

$$V_{AB}^B = \begin{bmatrix} V_{AB}^{Bx} \\ V_{AB}^{By} \\ V_{AB}^{Bz} \end{bmatrix} \quad (1)$$

The body frame may be further written in spherical coordinates in which the magnitude, angle of attack, and angle of side slip are defined. The magnitude is the norm of the velocity vector $\|V_{AB}^B\|$. The angle of attack is define using the variable $\alpha$.

$$\alpha = -\tan^{-1}\left(\frac{V_{AB}^{Bz}}{V_{AB}^{Bx}}\right) \quad (2)$$

The angle of side slip $\beta$ is defined as:

$$\beta = \tan^{-1}\left(\frac{V_{AB}^{By}}{V_{AB}^{Bz}}\right) \quad (3)$$

In this case, the terms $\tan^{-1}()$ is taken to mean the arc-tangent function. This somewhat unconventional definition has advantages when computing sensor fusion estimates. However, a conventional definition may be applied without loss of generality. A more conventional definition might be:

$$\beta = \sin^{-1}\left(\frac{V_{AB}^{By}}{\|V_{AB}^B\|}\right) \quad (4)$$

$$\alpha = \sin^{-1}\left(\frac{V_{AB}^{Bz}}{\|V_{AB}^B\|\cos\beta}\right) \quad (5)$$

In this case, the terms $\sin^{-1}()$ is taken to mean the arc-sine function. The static and stagnation pressures $p_0$ and $p_s$ are related to the relative air velocity through Mach number using the following relationship assuming compressible, sub sonic flow:

$$M = \frac{\|V_{AB}^B\|}{c_s} = \sqrt{\frac{2}{k-1}\left[\left(\frac{p_s}{p_0}\right)^{(k-1)/k} - 1\right]} \quad (6)$$

In this case M is the Mach number, k is the ratio of specific heats (with k≈1.4 for air), and $c_s$ is the sonic air speed defined by:

$$c_s = \sqrt{kRT_0} \quad (7)$$

The static air temperature is given by $T_0$ and the value for R is approximately 287.053 Nm/kgK.

Static pressure is the pressure of the free air at rest or by an instrument moving with the flow. Likewise, static temperature is the temperature of the free air at rest or moving with the flow. Both of these values are inter-related for most mediums including air and tables as well as functions defining $p_0$ and $T_0$ as a function of altitude are well known such as the 1976 Standard Atmosphere. However, these models are not absolute and day-to-day fluctuations may cause significant variations in the atmospheric temperature and pressure.

The stagnation pressure $p_s$ is defined as the pressure generated when the air flow is decelerated to zero speed by a frictionless process. Both static and stagnation pressure may be measured using a pitot tube in which two holes are placed in a single tube in the free stream. One hole or pressure tap is oriented to be directly in the path of the free stream in order to measure stagnation pressure while the other tap is orientated perpendicular to the stream in order to measure static pressure. Static and stagnation temperature can be measured in similar manners. In this case, stagnation temperature $T_s$ is the temperature generated when the air flow is decelerated to zero speed by a frictionless process. The relationship between static and stagnation temperature is similar to the one defined for the static and stagnation pressure and is related through Mach Number:

$$\frac{T_0}{T_s} = 1 + \frac{k-1}{2}M^2 = \left(\frac{p_0}{p_s}\right)^{(k-1)/k} \quad (8)$$

The pressure field around a lifting body is possibly nonlinear based on the location the pressure is measured on the body and the orientation of the body relative to the flow field. The relationship may be defined using the following:

$$p_i = f_{pB}(M, \alpha, \beta, l_i) \quad (9)$$

The function $f_{pB}()$ defines the pressure $p_i$ experienced on the lifting body as a function of Mach number, angle of attack, angle of sideslip, and the location $l_i$ of the pressure port on the body. This function may be calculated using computational fluid dynamics or measured experimentally in flight or in a wind tunnel.

For a set of N pressure ports, the angle of attack and sideslip may be estimated by a simple least squares solution calculated by first linearizing the model around the present estimate of angle of attack and sideslip and then taking a Taylor's series expansion around the error. By representing the lumping of higher order terms with the term "HOTs," the Taylor's series expansions for scalars are of the form:

$$f(\bar{x}+\delta x) = f(\bar{x}) + \frac{\partial f}{\partial x}\bigg|_{\bar{x}} \delta x + \frac{\partial^2 f}{2\partial x^2}\bigg|_{\bar{x}} \delta x^2 + HOTs \qquad (10)$$

Defining the error in the angle of attack $\delta\alpha = \alpha - \bar{\alpha}$ where $\bar{\alpha}$ is the current estimate of the true angle of attack $\alpha$, defining the error in sideslip as $\delta\beta = \beta - \bar{\beta}$ where $\bar{\beta}$ is the current estimate of the true sideslip $\beta$, and defining the error in Mach number $\delta M = M - \bar{M}$ in which $\bar{M}$ is the current estimate of the true Mach number M, then it is possible to perturb the defined function in equation number 9 about the current estimates to form a linearized state equation.

$$\tilde{p}_i = f_{pB}(\bar{M}, \bar{\alpha}, \bar{\beta}, l_i) + C_i \begin{bmatrix} \delta\alpha \\ \delta\beta \\ \delta M \end{bmatrix} + HOTs + v_i \qquad (11)$$

The symbol $\tilde{p}_i$ is taken to mean the measured pressure at location $l_i$ on the surface of the vehicle. The term $v_i$ is used to represent noise or error in the measurement. The matrix $C_i$ is the first order derivatives for the pressure port i defined as:

$$C_i = \begin{bmatrix} \frac{\partial f_{pBi}}{\partial \alpha} & \frac{\partial f_{pBi}}{\partial \beta} & \frac{\partial f_{pBi}}{\partial M} \end{bmatrix}_{\bar{\alpha},\bar{\beta},\bar{M}} \qquad (12)$$

The errors in equation number 11 can be grouped together into a single variable $\delta x$ defined as:

$$\delta x = \begin{bmatrix} \delta\alpha \\ \delta\beta \\ \delta M \end{bmatrix} \qquad (13)$$

If a set of N pressure ports are used with sufficient geometry, if the higher order terms of equation number 11 are assumed small, and if the noise $v_i$ for each pressure sensor is assumed zero mean Gaussian with variance $V_i$ which is independent of all other pressure sensors, then the error in the estimate can be computed using a weighted least squares estimator.

$$\delta\hat{x} = (C^T V^{-1} C)^{-1} C^T V^{-1} (\tilde{p} - f_{pB}) \qquad (14)$$

In this case the matrix $\tilde{p}$ is a column vector of all N pressure measurements $\tilde{p}_i$, $f_{pB}$ is likewise the column vector of a priori pressure estimates for each pressure location $l_i$, each row of the matrix C is the measurement sensitivity matrix $C_i$ for the location $l_i$ and the matrix V contains the measurement noise matrix with $V_i$ on the diagonal. The state may be updated using the following form:

$$\hat{x} = \bar{x} + \delta x \rightarrow \begin{bmatrix} \hat{\alpha} \\ \hat{\beta} \\ \hat{M} \end{bmatrix} = \begin{bmatrix} \bar{\alpha} \\ \bar{\beta} \\ \bar{M} \end{bmatrix} + \begin{bmatrix} \delta\alpha \\ \delta\beta \\ \delta M \end{bmatrix} \qquad (15)$$

More advanced, Extended Kalman Filters or particles filters may be used to improve and enhance estimates from time step to time step. Further, the linearization proposed in equation number 11 may be replaced with different types of transformations such as those used in the Modified Gain Extended Kalman Filter. The method presented here is given for example and is not limiting. Note that the form used requires at least three pressure measurements. One of the three variables $\alpha$, $\beta$, or M can eliminated from the estimation process and if the pressure sensors are placed at appropriate locations such that the matrix C has full column rank. A challenge associated with this method is that the nonlinear aerodynamics can cause great difficulties in the estimation of the function $f_{pB}$ to required accuracy.

However, the exemplary lifting body may be radially symmetric. Further the pressure sensors may be spaced equidistant from the centerline around the circumference (FIG. 1). Then the magnitude of each lever arm $l_i$ is the same and only angle $\theta_i$ around the axis of symmetry is required to define the location. Finally, suppose that to first order the gradient of the function is positive definite and nearly constant with respect to both $\alpha$ and $\beta$ within some reasonable values of $\alpha$ and $\beta$ summarized by:

$$\frac{\partial f_{pBi}}{\partial \alpha} = C_\alpha > 0, \; -\alpha_0 \leq \alpha \leq \alpha_0 \qquad (16)$$

$$\frac{\partial f_{pBi}}{\partial \beta} = C_\beta > 0, \; -\beta_0 \leq \beta \leq \beta_0$$

If the system is radially symmetric, then the further assumption may be made that the following holds true:

$$\frac{\partial f_{pBi}}{\partial \alpha} = \frac{\partial f_{pBi}}{\partial \beta} = C_\alpha \qquad (17)$$

In this case, the value of $C_i$ simplifies to:

$$C_{iS} = \begin{bmatrix} C_\alpha & C_\alpha & \frac{\partial f_{pBi}}{\partial M} \end{bmatrix}_{\bar{\alpha},\bar{\beta},\bar{M}} \qquad (18)$$

Then the pressure at any point $l_i$ is given by:

$$\tilde{p}_i = f_{pB}(\bar{M}, 0, 0, l_i) + C_{iS} C_{\theta i} \begin{bmatrix} \delta\alpha \\ \delta\beta \\ \delta M \end{bmatrix} + v_i \qquad (19)$$

The higher order terms in equation number 11 have been neglected for convenience. Since the pressure gradient is linear with respect to the angle of attack and sideslip, equation number 19 shows that the zero order term is now calculated about a zero angle of attack and sideslip. The rotation matrix $C_{\theta i}$ rotates the error in the angle of attack in the vehicle body frame into that component experienced by the pressure sensor at $l_i$. The matrix $C_{\theta i}$ is calculated using the following definition:

$$C_{\theta i} = \begin{bmatrix} \cos\theta_i & \sin\theta_i & 0 \\ -\sin\theta_i & \cos\theta_i & 0 \\ 0 & 0 & 1 \end{bmatrix} \quad (20)$$

Under these assumptions, it is possible to eliminate Mach number and further reduce the estimation process by comparing differential pressure between different pressure ports. Designating any of the $\tilde{p}_i$ pressure sensors as the primary, a differential measurement may be defined using the following equation:

$$\Delta \tilde{p}_i = \tilde{p}_i - \tilde{p}_p \quad (21)$$

$$= C_{iS} C_{\theta i} \begin{bmatrix} \delta\alpha \\ \delta\beta \\ \delta M \end{bmatrix} + v_i - C_{pS} C_{\theta p} \begin{bmatrix} \delta\alpha \\ \delta\beta \\ \delta M \end{bmatrix} + v_p$$

$$= C_{iS}(C_{\theta i} - C_{\theta p}) \begin{bmatrix} \delta\alpha \\ \delta\beta \\ \delta M \end{bmatrix} + \Delta v_i$$

The form of equation number 21 reduces since $C_{\theta i} - C_{\theta p}$ is zero in the terms related to Mach number. Therefore this state is eliminated. The remaining measurement is therefore:

$$\Delta \tilde{p}_i = C_{iSr}(C_{\theta ir} - C_{\theta pr}) \begin{bmatrix} \delta\alpha \\ \delta\beta \end{bmatrix} + \Delta v_i \quad (22)$$

In which the following "reduced" definitions are utilized:

$$C_{iSr} = [C_\alpha \quad C_\alpha] \quad (23)$$

$$C_{\theta ir} = \begin{bmatrix} \cos\theta_i & \sin\theta_i \\ -\sin\theta_i & \cos\theta_i \end{bmatrix} \quad (24)$$

$$C_{\theta pr} = \begin{bmatrix} \cos\theta_p & \sin\theta_p \\ -\sin\theta_p & \cos\theta_p \end{bmatrix} \quad (25)$$

The weighted least squares solution to the angle problem is therefore:

$$\delta\hat{x} = (C_R^T \Delta V^{-1} C_R)^{-1} C_R^T \Delta V^{-1}(\Delta \tilde{p}) \quad (26)$$

In which case the measurement matrix $C_{Ri}$ is defined using equation number 27 and the matrix $C_R$ is the collection of all of the $C_{Ri}$ matrices.

$$(27) \quad C_{Ri} = C_{iSr}(C_{\theta ir} - C_{\theta pr})$$

The matrix $\Delta V$ is defined as:

$$\Delta V = \begin{bmatrix} V_1 + V_P & -V_P & \ldots & -V_P \\ -V_P & V_2 + V_P & \ldots & -V_P \\ \vdots & \vdots & \ddots & -V_P \\ -V_P & -V_P & -V_P & V_N + V_P \end{bmatrix} \quad (28)$$

The correction of the state proceeds as in equation 15. One may note that the present example is not inclusive. Instead of using a primary pressure sensor, each pressure sensor could be differenced with its neighbor or with the pressure sensor with an equal but opposite angle if available. Clearly, the observability of equation number 22 improves if the two differenced pressures have large separation angles. This method provides a cost effective and easy way for estimating angle of attack with limited information about the body. If the body is not radially symmetric, but merely symmetric about the y and z axes (with the x axis facing into the air flow) such that the cross section forms more of an oval shape, then $C_{iSr}$ or $C_{iS}$ could be modified to include different values or even cross terms with respect to the orientation of the body.

However, if the aerodynamics are not known, then it is still possible to measure effective angle of attack and sideslip types of variables. In this case, a simple analytic combination of the sensitivity to angle of attack $C_\alpha$ with the error in angle of attack $\delta\alpha$ is made. The estimates are made with a new set of variables defined in the following way:

$$\delta\alpha_S = C_\alpha \delta\alpha$$

$$\delta\beta_S = C_\beta \delta\beta \quad (29)$$

The new measurement function becomes:

$$\Delta \tilde{p}_i = [1 \quad 1](C_{\theta ir} - C_{\theta pr}) \begin{bmatrix} \delta\alpha_S \\ \delta\beta_S \end{bmatrix} + \Delta v_i \quad (30)$$

The estimation process proceeds as before where only the values of $\delta\alpha_S$ and $\delta\beta_S$ are estimated and updated using the least squares solution.

$$\begin{bmatrix} \delta\hat{\alpha}_S \\ \delta\hat{\beta}_S \end{bmatrix} = (C_{RS}^T \Delta V^{-1} C_{RS})^{-1} C_{RS}^T \Delta V^{-1}(\Delta \tilde{p}) \quad (31)$$

The value for $C_{RS}$ is defined as the matrix with rows corresponding to $C_{RSi}$ for each available pressure measurement:

$$C_{RSi} = [1 \quad 1](C_{\theta ir} - C_{\theta pr}) \quad (32)$$

This method has the advantage that the aerodynamics are not well known, only assumed linear with respect to some gross, reasonable angle of attack and sideslip. This simplification can adjust an arbitrary arrangement of pressure sensors into a measure of $\delta\alpha_S$ and $\delta\beta_S$ which may be used for feedback control rather than $\delta\alpha$ or $\delta\beta$, thereby simplifying the problem of modeling significantly. Note that this method may be expanded to include a different definition of $\delta\beta_S = C_\beta \delta\beta$ or cross-terms between $\delta\alpha$ and $\delta\beta$ if the sensitivity of the aerodynamics warrant it, for instance if $C_\beta \neq C_\alpha$.

It is possible to solve for the relative velocity ratios.

$$-\tan(\delta\hat{\alpha}) = \frac{\hat{V}_{AB}^{Bz}}{\hat{V}_{AB}^{Bx}} \tag{33}$$

$$\tan(\delta\hat{\beta}) = \frac{\hat{V}_{AB}^{By}}{\hat{V}_{AB}^{Bz}} \tag{34}$$

One may note that if $\delta\alpha_S$ and $\delta\beta_S$ are applied, one may solve for the velocity ratios using small angle approximations:

$$\frac{-\tan(\delta\hat{\alpha}_S)}{\tan(\delta\hat{\beta}_S)} \approx \frac{C_\alpha \delta\alpha}{C_\alpha \delta\beta} = \frac{\delta\alpha}{\delta\beta} = \frac{\hat{V}_{AB}^{Bz}}{\hat{V}_{AB}^{By}} \tag{35}$$

Further, if a Mach number is desired, an additional set of symmetric pressure sensors may be employed such that the second set of pressure sensors forms a new ring either farther forward or further behind the first ring along the x axis (FIG. 2). This new ring may be differenced with the existing pressure sensor to the extent that the value for $C_\alpha$ changes as a function of the ring position along the center line, the difference of measurements from the first ring with the second would produce measurements which could be used to either further enhance estimates of Mach, angle of attack, and sideslip or else utilize the results of the first ring to provide angle of attack and sideslip and therefore only estimate Mach number. Pressure sensors from ring j would have pressure functions corresponding to:

$$\tilde{p}_{ij} = f_{pB}(\overline{M}, 0, 0, l_{ij}) + C_{ijS} C_{\theta ij} \begin{bmatrix} \delta\alpha \\ \delta\beta \\ \delta M \end{bmatrix} + v_{ij} \tag{36}$$

In this case, the following definitions apply for each pressure measurement $\tilde{p}_{ij}$ where i is the index of the pressure sensor and j represents the index of the ring utilized.

$$C_{ijS} = [C_{\alpha j} \quad C_{\alpha j} \quad C_{Mij}] \tag{37}$$

$$C_{Mij} = \frac{\partial f_{pBi}}{\partial M}\bigg|_{\overline{\alpha},\overline{\beta},\overline{M}} \tag{38}$$

$$C_{\theta ij} = \begin{bmatrix} \cos\theta_{ij} & \sin\theta_{ij} & 0 \\ -\sin\theta_{ij} & \cos\theta_{ij} & 0 \\ 0 & 0 & 1 \end{bmatrix} \tag{39}$$

Likewise, for pressure sensors $\tilde{p}_{ik}$ located on the pressure ring k, the following pressure measurement model would be valid and have the subsequent definitions for the terms within equation number 40.

$$\tilde{p}_{ik} = f_{pB}(\overline{M}, 0, 0, l_{ik}) + C_{ikS} C_{\theta ik} \begin{bmatrix} \delta\alpha \\ \delta\beta \\ \delta M \end{bmatrix} + v_{ik} \tag{40}$$

$$C_{ikS} = [C_{\alpha k} \quad C_{\alpha k} \quad C_{Mik}] \tag{41}$$

$$C_{Mik} = \frac{\partial f_{pBi}}{\partial M}\bigg|_{\overline{\alpha},\overline{\beta},\overline{M}} \tag{42}$$

$$C_{\theta ik} = \begin{bmatrix} \cos\theta_{ik} & \sin\theta_{ik} & 0 \\ -\sin\theta_{ik} & \cos\theta_{ik} & 0 \\ 0 & 0 & 1 \end{bmatrix} \tag{43}$$

Note that if $C_{\alpha j} \neq C_{\alpha k}$ for all i sensors and if $C_{Mij} \neq C_{Mik}$ then the difference between two measurements $\tilde{p}_{ij}$ and $\tilde{p}_{ik}$ would have the following measurement model:

$$\Delta\tilde{p}_{ijk} = f_{pB}(\overline{M}, 0, 0, l_{ij}) - f_{pB}(\overline{M}, 0, 0, l_{ik}) + \tag{44}$$

$$(C_{ijS} C_{\theta ij} - C_{ikS} C_{\theta ik}) \begin{bmatrix} \delta\alpha \\ \delta\beta \\ \delta M \end{bmatrix} + v_{ij} - v_{ik}$$

The weighted least squares solution may be constructed again using any two or all of the measurements as desired.

$$\delta\hat{x} = (C_{jk}^T \Delta V_{jk}^{-1} C_{jk})^{-1} C_{jk}^T \Delta V_{jk}^{-1} (\Delta\tilde{p}_{ijk}) \tag{45}$$

And the update is performed as in equation number 15. The matrix $C_{jk}$ constructed for all measurements, each having matrix $C_{jki}$ defined in equation number 46.

$$C_{jki} = (C_{ijS} C_{\theta ij} - C_{ikS} C_{\theta ik}) \tag{46}$$

The measurement noise matrix $\Delta V_{jk}$ is constructed appropriately for the differences provided. If only one measurement on ring k is utilized to difference with all of the sensors on ring j then the measurement error matrix becomes the following:

$$\Delta V = \begin{bmatrix} V_{1j} + V_{1k} & -V_{1k} & \ldots & -V_{1k} \\ -V_{1k} & V_{2j} + V_{1k} & \ldots & -V_{1k} \\ \vdots & \vdots & \ddots & -V_{1k} \\ -V_{1k} & -V_{1k} & -V_{1k} & V_{Nj} + V_{1k} \end{bmatrix} \tag{47}$$

The above discussion suggests that multiple rings of sensors could be combined in a linear combination of pressure measurements that would effectively estimate angle of attack and sideslip in a manner that could be independent of the error in Mach number. These types of combinations will be dependent on the orientation of the pressure sensors and the designer's prerogative.

Another option is that only one ring may be needed and that only one additional pressure sensor with sufficiently different sensitivity to Mach number ($C_{Mk} \neq C_{Mj}$) may be required to estimate all of the angle of attack, sideslip, and, Mach number. Finally, it is possible that no concentric ring set may be required; only a finite number of pressure sensors distributed at known locations with known pressure sensitivities to angle of attack, sideslip, and Mach number may be required.

Alternatively, it is possible to forego the estimation of Mach number and merely estimate the ratio of stagnation to static pressure $$\left(\delta\left(\frac{p_s}{p_0}\right)\right)$$

through the utilization of equation number 6. Alternatively it is possible to estimate the ratio of stagnation to static temperature $$\left(\delta\left(\frac{T_0}{T_s}\right)\right)$$

using equation number 8. In theory, it should be possible to repeat the entire process with temperature sensors at locations $l_i$ rather than or in addition to pressure sensors if sufficient temperature sensitivity and dynamic range, i.e., responsiveness to changes, could be found in the temperature sensors for the given application. A result one may note is that the estimation of Mach number, pressure ratios, or temperature ratios are interchangeable. Further, if a particular port is placed on the body such that for the range of angle of attack and sideslip defined, the stagnation properties are relatively unchanged, such as by building the port using a conic opening, then it is possible to estimate static temperature and static pressure from the stagnation estimates. Due to the design of the structure, the reverse relationship is true where static temperature or pressure is defined. However, since it is possible to estimate both static and dynamic pressure separately, it may be better to augment the state in order to estimate both. Given sufficient calibration data with regards to the vehicle, the state may be augmented to estimate static pressure, as well as, Mach number or stagnation pressure and static pressure, or static and stagnation pressure. For this implementation, Mach and static pressure are selected.

The measurement function becomes:

$$\tilde{p}_i = f_{pB}(\overline{M}, \overline{p}_0, \overline{\alpha}, \overline{\beta}, l_i) + C_i \begin{bmatrix} \delta\alpha \\ \delta\beta \\ \delta M \\ \delta p_0 \end{bmatrix} + HOT's + v_i \quad (48)$$

The sensitivity matrix $C_i$ becomes:

$$C_i = \begin{bmatrix} \frac{\partial f_{pBi}}{\partial \alpha} & \frac{\partial f_{pBi}}{\partial \beta} & \frac{\partial f_{pBi}}{\partial M} & \frac{\partial f_{pBi}}{\partial p_0} \end{bmatrix}_{\overline{\alpha}, \overline{\beta}, \overline{M}, \overline{p}_0} \quad (49)$$

Given sufficient measurements of static pressure, it is possible to develop a least squares solution provided the proper calibration of the pressure sensors and vehicle shape. This filter takes the form in equation number 50 where the rows of matrix C are made up of the matrices $C_i$ defined in equation number 49.

$$\delta\hat{x} = (C^T V^{-1} C)^{-1} C^T V^{-1} (\tilde{p} - f_{pB}) \quad (50)$$

The state correction is performed linearly:

$$\hat{x} = \overline{x} + \delta x \rightarrow \begin{bmatrix} \hat{\alpha} \\ \hat{\beta} \\ \hat{M} \\ \hat{p}_0 \end{bmatrix} = \begin{bmatrix} \overline{\alpha} \\ \overline{\beta} \\ \overline{M} \\ \overline{p}_0 \end{bmatrix} + \begin{bmatrix} \delta\alpha \\ \delta\beta \\ \delta M \\ \delta p_0 \end{bmatrix} \quad (51)$$

The previous simplifications and variations may also be modified to include the updated state space including making linear assumptions about the sensitivity to angle of attack and sideslip. The primary importance of this modification is that the estimate of static pressure directly relates to altitude through a model such as the 1976 standard atmosphere. Therefore, the vehicle shape is utilized to estimate the altitude of the vehicle as well as Mach number, angle of attack, and sideslip. From Mach number and static temperature, it is possible to derive air speed for the body. An estimate of static temperature $\hat{T}_0$ directly measured, derived, or assumed enables the calculation of sonic speed. Therefore the magnitude of velocity is:

$$\|\hat{V}_{AB}{}^B\| = \hat{c}_s \hat{M} \quad (52)$$

The value for $\hat{c}_s$ is defined by:

$$\hat{c}_s = \sqrt{kR\hat{T}_0} \quad (53)$$

The complete relative velocity vector is then reconstructed from the estimates of angle of attack, angle of sideslip, and air speed.

$$\hat{V}_{AB}^{Bx} = \frac{\|\hat{V}_{AB}^B\|}{\sqrt{1 + \tan^2\hat{\alpha} + \tan^2\hat{\beta}}} \quad (54)$$

$$\hat{V}_{AB}^{Bz} = -\hat{V}_{AB}^{Bx}\tan\hat{\alpha} \quad (55)$$

$$\hat{V}_{AB}^{By} = -\hat{V}_{AB}^{Bx}\tan\hat{\beta} \quad (56)$$

This type of sensor system may be utilized to estimate air speed, angle of attack, and angle of side slip.

Finally, as stated previously, it is possible to estimate altitude from the estimate of static pressure using standard look up tables, such as the 1976 standard atmosphere. Given an estimate of $\hat{p}_0$ it is possible to estimate altitude (or depth) for the given medium. While the actual altitude may not be accurate depending on variations, the local rate of change of altitude will be dependent upon the sensitivity of the pressure sensor. Therefore altitude rate may be determined by differencing in time the altitude result of two successive static pressure measurements.

2.2 Fault Detection

If sufficient pressure sensors are available, it may be possible to detect even small failures in one pressure sensor by comparing it with the other pressure sensors in the group. This section outlines a method for performing a least squares fault detection filter using subsets of pressure sensors and the Mulitple Hypothesis Shiryayev Sequential Probability Ratio Test (MHSSPRT) to detect changes in health, identify failures, and remove faulty pressure sensors from the set of measurement utilized to estimate the error. FIG. 5 shows a basic block diagram in which the pressure sensors 401-403 are passed through the filter structures 504-507 and the MHSSPRT 508 estimates the probability of a failure.

Given N pressure sensors, the sensors are segregated into subsets. Each subset contains N of the sensors with the exception of sensor i. The subgroup i which excludes sensor measurement $\tilde{p}_i$ represents a set of measurements that hypothesizes a failure in $\tilde{p}_i$. In a failure occurs, then the sensor error model is modified to include the unknown, scalar fault signal $\mu_i$ as shown in equation number 57 with definitions the same as those defined in equation number 11.

$$\tilde{p}_i = f_{pB}(\overline{M}, \overline{\alpha}, \overline{\beta}, l_i) + C_i \begin{bmatrix} \delta\alpha \\ \delta\beta \\ \delta M \end{bmatrix} + v_i + \mu_i \quad (57)$$

For this case, a residual is defined for sensor i.

$$\tilde{r}_i = \tilde{p}_i - f_{pBi} - C_i \begin{bmatrix} \delta\alpha \\ \delta\beta \\ \delta M \end{bmatrix} - v_i - \mu_i \quad (58)$$

The residual is a function of the a priori estimates of Mach number, angle of attack, and sideslip as well as the error in those estimates, the noise in the measurement and the possible fault signal. Given a set of residuals for multiple pressure sensors in subgroup j which happens to include $\tilde{p}_i$, the combined residual for all of the measurements in the subgroup is defined as follows:

$$\tilde{r} = \tilde{p} - f_{pB} - C \begin{bmatrix} \delta\alpha \\ \delta\beta \\ \delta M \end{bmatrix} - v - E_i\mu_i \quad (59)$$

In this case $E_i$ is a column matrix with all zeros except a 1 entered at the row representing measurement i. A modified residual is constructed by annihilating the error in the state using a projector $H_p$ defined in equation number 60 such that $H_pC=0$.

$$H_p = C - C(C^TC)^{-1}C^T \quad (60)$$

The projected residual is defined in equation number 61 where the error in the estimate has been annihilated and the assumption is made that $\tilde{p}_i \approx f_{pB}$ leaving only the noise and the fault signal.

$$\tilde{r}_p = H_p\tilde{r} \approx H_p(v+E_i\mu_i) \quad (61)$$

If no fault exists ($\mu_i=0$), then the residual $\tilde{r}_p$ is zero mean with noise variance V, assuming Gaussian noise. The probability density function for the residual is given in equation number 62 in which the subscript for subgroup j has been reintroduced and n represents the number of measurements in subgroup j.

$$f_j(\tilde{r}_{pj}) = \frac{1}{(2\pi)^{n/2}|V_j|^{\frac{1}{2}}} \exp^{-\frac{1}{2}(\tilde{r}_{pj})^T V_j^{-1}(\tilde{r}_{pj})} \quad (62)$$

An exemplary density function may be constructed for each of the N subgroups. Each subgroup represents a hypothesis that the excluded measurement is faulty. If no fault exists, then the projected residual will remain near zero and the density function will remain near unity. If a fault exists, then the residual becomes non zero and the density function will move towards zero.

In order to test the different hypotheses, the MHSSPRT is utilized to calculate the probability that each hypothesis is correct given the probability that all other hypotheses are correct. A total of N+1 hypotheses are assumed including the healthy hypothesis that no faults exist. Each of the N+1 hypotheses is represented by the symbol $\mathcal{H}_j$ with the healthy hypothesis represented by the symbol $\mathcal{H}_0$. Each hypothesis $\mathcal{H}_j$ assumes that a failure occurred in pressure sensor j at or before the current time. The hypothesis is "tested" by examining all measurements except the measurement that is hypothesized as failed and calculating the probability that this hypothesis is correct as compared with all other hypotheses. The a priori probability that $\mathcal{H}_j$ is correct is given by $\Theta_j$ and the a priori probability that $\mathcal{H}_0$ is given by $\Theta_0$. The MHSSPRT calculates the probability $\Theta_j$ that a failure has occurred in the excluded measurement j at or before the current time $t_k$.

Explicitly $$\Theta_j = \text{prob}(t_{fj} <= t_k | H_j, \tilde{r}_{pj,k-1}) \quad (63)$$

In this case, $t_{fj}$ is the time at which a failure in sensor j occurs, and $\tilde{r}_{pj,k-1}$ represents the projected residual at time $t_{k-1}$. When a new set of measurements are provided at time $t_k$, the probability is updated using the new information. The a posteriori probability $F_j$ is calculated using $\tilde{r}_{pj,k}$ as shown in the following equation:

$$F_j = \frac{\Theta_j f_j(\tilde{r}_{pj,k})}{\sum_{m=0}^{N} \Theta_m f_m(\tilde{r}_{pm,k})} = \text{prob}(t_{fj} <= t_k | H_j, \tilde{r}_{j,k}) \quad (64)$$

After each update, the probability is "propagated forward in time by introducing a probability $p_c$ that the failure occurred between measurement updates.

$$\Theta_j = F_j + p_c(1 - \Sigma_{m=0}^{N} F_m) : m \neq j; j \neq 0 \quad (65)$$

The "healthy" hypothesis is calculated as the probability that none of the failures exist as shown in the following equation:

$$\Theta_0 = 1 - (\Sigma_{m=1}^{N}\Theta_m) \quad (66)$$

Once the probability is propagated using equation numbers 65 and 66, the entire process of updating the probabilities and then propagating is repeated over and over as new measurements become available. The process stops on one of two events. If the probability of the healthy hypothesis (a priori or a posteriori) drops below a defined threshold then a failure is declared. The failure is detected and action may be taken, such as discontinuing operations. If it is desired to isolate the failure, then the process continues. If the probability that one of the unhealthy hypotheses, $\mathcal{H}_j$, exceeds a defined threshold, then the failure is identified. The measurement is removed from the set of healthy measurements. The process is then restarted using only the remaining healthy measurements and the process of health monitoring continues. The unhealthy measurement is flagged and may be tested to see if the measurement becomes healthy again resulting in its re-introduction back into the group of healthy measurements. One may note that the above analysis assumed a Gaussian noise density function, which is not required. Other density functions, such as Cauchy or Rayleigh, may be introduced to represent the uncertainty in the residual. While very effective and sensitive, the MHSSPRT may be replaced with the residual processors, such as a simple Chi-Square test. Further, other residual processes may be tested. For instance, in the previous section a simplified measurement model was utilized in equation number 19. Under these circumstances, the fault measurement model becomes:

$$\tilde{p}_i = f_{pB}(\overline{M}, 0, 0, l_i) + C_{iS}C_{\theta i}\begin{bmatrix} \delta\alpha \\ \delta\beta \\ \delta M \end{bmatrix} + v_i + \mu_i \quad (67)$$

The test residual for subgroup j using all measurements (excluding measurement j, but including measurement i) becomes:

$$\tilde{r} = \tilde{p} - f_{pB} - C_{iS}C_{\theta i}\begin{bmatrix} \delta\alpha \\ \delta\beta \\ \delta M \end{bmatrix} - v - E_i\mu_i \quad (68)$$

The projector becomes $$H_p = (C_{iS}C_{\theta i}) - (C_{iS}C_{\theta i})((C_{iS}C_{\theta i})^T(C_{iS}C_{\theta i}))^{-1}(C_{iS}C_{\theta i})^T \quad (69)$$

Processing proceeds as before using the new projector in equation number 69 operating on the new residual in equation number 68. A similar process holds for the reduced order differential pressure measurements defined in equation number 22 in which case the fault model becomes:

$$\Delta\tilde{p}_i = C_{iSr}(C_{\theta ir} - C_{\theta pr})\begin{bmatrix} \delta\alpha \\ \delta\beta \end{bmatrix} + \Delta v_i + \mu_i \quad (70)$$

Note that the failure still assumes a fault in measurement i. An additional hypothesis should be introduced which designates a new primary pressure sensor for that subset and excludes the primary pressure sensor from the subgroup entirely. In this way, a subgroup will exist that does not utilize the primary measurement. Alternative linear combinations are also possible, such as merely differencing each pressure sensor with the neighbor sensor. For the present case in which primary pressure sensors are utilized, the residual becomes:

$$\tilde{r} = \Delta \tilde{p}_i - C_{iSr}(C_{\theta ir} - C_{\theta pr})\begin{bmatrix} \delta\alpha \\ \delta\beta \end{bmatrix} - \Delta v_i - E_i\mu_i \tag{71}$$

The new projector is defined in equation number 72 with $C_R$ defined for the subgroup j using equation number 27 for each measurement in the group.

$$H_p = C_R - C_R(C_R^T C_R)^{-1} C_R^T \tag{72}$$

The alternative form of equation number 30 may also be used in which case the fault model becomes:

$$\Delta \tilde{p}_i = [1 \quad 1](C_{\theta ir} - C_{\theta pr})\begin{bmatrix} \delta\alpha_S \\ \delta\beta_S \end{bmatrix} + \Delta v_i + \mu_i \tag{73}$$

The residual becomes:

$$\tilde{r} = \Delta \tilde{p}_i - [1 \quad 1](C_{\theta ir} - C_{\theta pr})\begin{bmatrix} \delta\alpha_S \\ \delta\beta_S \end{bmatrix} - \Delta v_i - E_i\mu_i \tag{74}$$

The projector takes the form in equation number 75 with $C_{RS}$ defined as the matrix built from the matrices $C_{RSi}$ defined in equation number 32.

$$H_p = C_{RS} - C_{RS}(C_{RS}^T C_{RS})^{-1} C_{RS}^T \tag{75}$$

Finally, for concentric rings, or for the measurements with different sensitivities to Mach number, then the new fault model for sensor i becomes:

$$\Delta \tilde{p}_{ijk} = f_{pB}(\overline{M}, 0, 0, l_{ij}) - f_{pB}(\overline{M}, 0, 0, l_{ik}) + \tag{76}$$

$$(C_{ijS}C_{\theta ij} - C_{ikS}C_{\theta ik})\begin{bmatrix} \delta\alpha \\ \delta\beta \\ \delta M \end{bmatrix} + v_{ij} - v_{ik} + \mu_{ij} - \mu_{ik}$$

Note that in this case, care should be taken to construct a group of residuals, such that only one fault or $\mu_{ij}$ or $\mu_{ik}$ may be included. This can be done through proper construction of linear combinations of measurements. The simplest form is to simply take all measurements on ring j and difference them with the same measurement on ring k. A MHSSPRT is constructed based on subsets of the measurements in ring j. In this subset, it is assumed that $\mu_{jk}=0$. The residual is calculated as shown in equation number 77 with $E_{ij}$ a column vector of zeros with a 1 at the location of measurement $\tilde{p}_{ij}$ and $C_{jk}$ constructed from $C_{jki}$ defined in equation number 46:

$$\tilde{r} = f_{pB}(\overline{M}, 0, 0, l_{ij}) - f_{pB}(\overline{M}, 0, 0, l_{ik}) - C_{jk}\begin{bmatrix} \delta\alpha \\ \delta\beta \\ \delta M \end{bmatrix} - v_{ij} + v_{ik} - E_{ij}\mu_{ij} \tag{77}$$

The projector is then defined using the following:

$$H_p = C_{jk} - C_{jk}(C_{jk}^T C_{jk})^{-1} C_{jk}^T \tag{78}$$

Processing proceeds as before. A second MHSSPRT is constructed to detect failures on ring k, by differencing all of the pressure sensors on ring k with the same pressure sensor on ring j. The definitions of the residual and projector are the same as in equation numbers 77 and 78.

These residuals and faults models may be constructed in parallel or separately. All of the models presented can be tested simultaneously and independently. The block diagram 500 of the pressure fault detection filters 504-506 using least squares is shown in FIG. 5 in which it is shown that for each pressure transducer 401-403, there is one hypothesized failure in the pressure sensors and the MHSSPRT 508 calculates the probability of a failure 509 in each pressure sensor incorporating the healthy filter model 507. The fault free estimate 510 is determined from the filter subset that excluded the sensor with a high probability of failure.

The previous example may be used to detect failures in pressure sensors. A similar methodology may be utilized to estimate temperature failures. FIG. 6 shows a block diagram 600 in which an exemplary implementation is disclosed in which the fault free pressures 604 are utilized with the temperature sensors 404-406 to form a new bank of fault detection filters 605-607 and the MHSSPRT 609, along with a healthy sensor filter 608 calculates the probability of a failure in the temperatures 610 and a fault free estimate of velocity 611. For any temperature sensor co-located with a pressure sensor, the ratio of that pressure sensor to the estimated static pressure will have a deterministic relationship with the temperature measured versus the static temperature through the Mach number relationship described in equation number 8. The relationship between temperature and pressure is defined through ideal gas law in equation number 79 in which ρ is the air density which may be determined from the 1976 standard atmosphere given an estimate of static pressure $p_0$ or equivalent table look up for all fluid properties, and R is approximately 287.053 Nm/kgK.

$$p = \rho R T \tag{79}$$

The main issue is the measurement of either $T_0$ or $T_s$ through the means outlined previously such as measuring static temperature at a location perpendicular to the air flow (or nearly so) or measuring stagnation temperature through a port that is designed to gather stagnation air qualities for some wide range of angle of attack and sideslip. If none of these methods are available, then it may be possible to construct a temperature function based on the shape of the vehicle similar to the pressure distribution function. The entire process presented may be repeated using temperature measurements rather than pressure measurements. If one is measured, the other may be derived from the relationship as defined by equation number 8 and using the results of the pressure sensor suite estimates to form the ratio. If both are measured, then it is possible to detect failures in ether by comparing the ratio of stagnation to static temperature to the relationship with the fault free stagnation and static pressure sensors. In either case, using vehicle models or stagnation property relationships, it is possible to construct a bank of filters 605-608 similar to the ones defined for the pressure sensors 401-403 in order to estimate the probability of a failure 610 in the temperature sensors 404-406 as depicted in FIG. 6.

In any event, if the static pressure is known, the static temperature can be predicted through the 1976 standard atmosphere model. If stagnation temperature is measured, it can be compared against a predicted stagnation pressure using the following relationship in which $\tilde{T}_0$ is calculated from the 1976 standard atmosphere based on $\hat{p}_0$ where both $\hat{p}_0$ and $\hat{p}_s$ are derived from the result of the least squares state estimation process presented. The difference between $\tilde{T}_s$ and $T_0$ can be utilized to detect failures based on the assumed statistical properties of the temperature measurement and the uncertainties in the pressure sensors through a simple parity relationship.

$$\tilde{T}_s - \overline{T}_s = \tilde{T}_s - T_0 \left(\frac{\hat{p}_0}{\hat{p}_s}\right)^{-(k-1)/k} \tag{80}$$

2.3 Estimating the Vertical Using Air Data

Given that it is possible to estimate the altitude rate using the estimates of static pressure, the pressure decreases as altitude increases and the pressure increases as altitude decreases. Specifically, given the 1976 standard atmosphere model, the altitude is a function of static pressure:

$$\hat{h} = f_h(\hat{p}_0) \tag{81}$$

In this case, the function $f_h$ represents the 1976 standard atmosphere (or some other atmospheric model) and $\hat{h}$ represents the estimate of altitude from the estimate of static pressure $\hat{p}_0$. A rate of change of altitude may be constructed from two successive estimates of static pressure.

$$\hat{\dot{h}} = \frac{\hat{h}(t_k) - \hat{h}(t_{k-1})}{t_k - t_{k-1}} - f_h(\hat{p}_0(t_k) - \hat{p}_0(t_{k-1})) \tag{82}$$

In this case, the current time is $t_k$ and the previous time step is $t_{k-1}$. The simple differentiation filter in equation number 82 is for example and other filters could be utilized to estimate the rate of change of altitude, for example. The rate of change of altitude is by definition in the local tangent (again North-East-Down, NED) frame.

The problem has been that the angle of attack and sideslip have been defined in the body frame of the vehicle. However, the body frame may or may not coincide with the local tangent frame which is significant because gravity acts to pull the vehicle down and the vehicle must generate lift in order to stay in the air.

2.4 Estimating Orientation Assuming a Pendulum

Figure 7:
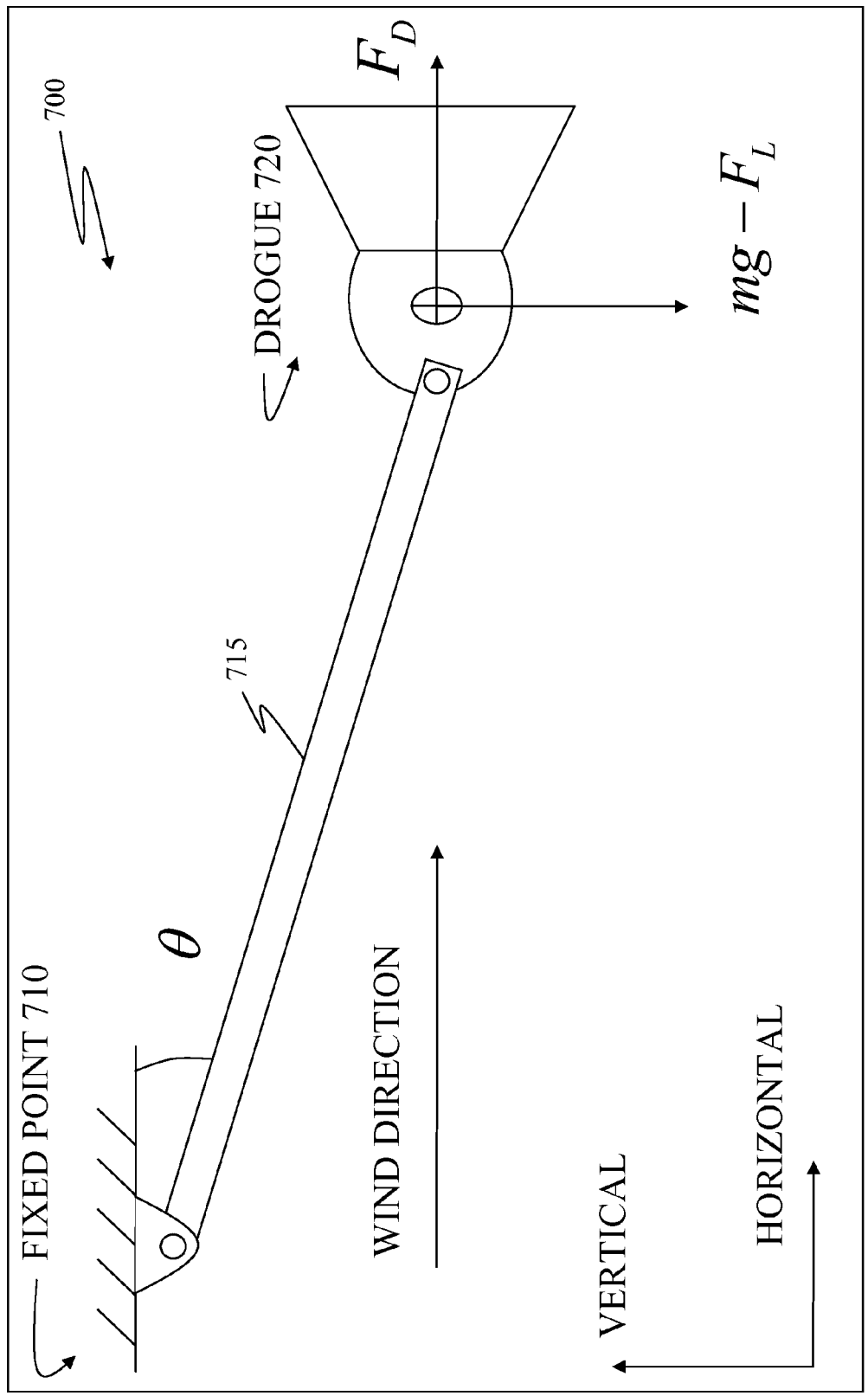
FIG. 7 is an example of a towed drogue pendulum.

FIG. 7 shows a simplified drogue dynamics model 700. Given that the body considered in this document is a tethered object towed behind a vehicle, the basic dynamics may be utilized to determine the static pressure gradient and determine the vertical axis. A simple pendulum problem with a mass hung rigidly from a fixed point 710 through a hypothetically massless beam 715 will suffice to describe the dynamics involved, although this example is utilized by example and the actual analysis will work for a real world, mass filled, non-rigid tether.

The image 700 in FIG. 7 shows a basic arrangement. The drag force $F_D$ balances the moment induced at the fixed point hinge by the weight mg minus the lift force $F_D$ of the drogue thus keeping the lever at a constant angle $\theta$ relative to the fixed point. The fixed point may be, by example, an aircraft with mass significantly larger than the drogue. All forces are taken in the local tangent frame relative to the Earth. Any increase in $F_D$ causes a decrease in $\theta$. Therefore, the orientation of the drogue 720 may be deduced by inducing drag fluctuations in order to map out the local gradient in static pressure. The result is the ability to control altitude. Note that increased drag increases altitude for the three dimensional problem as well and induces a damping force into any oscillations.

The drag force in the body frame of the drogue is defined by equation number 83 in which the drag force is equal to the stagnation pressure $p_s$ multiplied by the reference area of the drogue S multiplied by the coefficient of drag $C_D$.

$$F_X^B = C_D p_s S \tag{83}$$

Likewise, the lift force in the vehicle body frame is defined in equation number 84 in which the lift coefficient $C_L$ has been introduced.

$$F_Z^B = -C_L p_s S \tag{84}$$

A third side force $F_Y^B$ may be introduced as shown in equation number 85.

$$F_Y^B = C_y p_s S \tag{85}$$

The coefficient of lift, drag, and side force on the drogue are all a function of Mach number, angle of attack, angle of sideslip, and any actuator deflection $\delta v_i$ on the drogue canopy for each of the N actuators.

$$C_L = f_L(M, \alpha, \beta, \delta v_1, \ldots \delta v_N) \tag{86}$$

$$C_D = f_D(M, \alpha, \beta, \delta v_1, \ldots \delta v_N) \tag{87}$$

$$C_y = f_y(M, \alpha, \beta, \delta v_1, \ldots \delta v_N) \tag{88}$$

Note that the definition of angle of attack and sideslip are still from the body to the air mass motion frame. However, the lift and drag (and horizontal side force) are defined in the local tangent frame. The relationship is defined in equation number 89 in which the cosine rotation matrix $C_B^T$ is introduced to rotate from the body frame to the local tangent frame.

$$\begin{bmatrix} F_D^T \\ F_Y^T \\ F_L^T \end{bmatrix} = C_B^T \begin{bmatrix} F_X^B \\ F_Y^B \\ F_Z^B \end{bmatrix} \tag{89}$$

In this case, the local tangent frame is rotated with respect to the pitch and roll angle of the body, but not the yaw. The yaw angle is taken to be the same for both frames. The order of rotation considered here is roll first and then pitch. Therefore $C_B^T$ is defined in equation number 90 with $\phi$ defined as the roll angle about the body x axis and $\theta$ defined as the pitch angle about the body y axis.

$$C_B^T = \begin{bmatrix} \cos\theta & 0 & \sin\theta \\ 0 & 1 & 0 \\ -\sin\theta & 0 & \cos\theta \end{bmatrix} \begin{bmatrix} 1 & 0 & 0 \\ 0 & \cos\phi & -\sin\phi \\ 0 & \sin\phi & \cos\phi \end{bmatrix} \tag{90}$$

Given estimates of pitch and roll, $\overline{\theta}$ and $\overline{\phi}$ respectively, the estimated rotation matrix is defined as:

$$\overline{C}_B^T = \begin{bmatrix} \cos\overline{\theta} & 0 & \sin\overline{\theta} \\ 0 & 1 & 0 \\ -\sin\overline{\theta} & 0 & \cos\overline{\theta} \end{bmatrix} \begin{bmatrix} 1 & 0 & 0 \\ 0 & \cos\overline{\phi} & -\sin\overline{\phi} \\ 0 & \sin\overline{\phi} & \cos\overline{\phi} \end{bmatrix} \tag{91}$$

The relationship between the true rotation matrix and the estimate is defined in equation number 92 with the error in pitch as $\delta\theta$ and the error in roll defined as $\delta\phi$ to be estimated.

$$C_B^T \approx \overline{C}_B^T \left( I + \begin{bmatrix} 0 & 0 & \delta\theta \\ 0 & 0 & -\delta\phi \\ -\delta\theta & \delta\phi & 0 \end{bmatrix} \right) = \overline{C}_B^T (I + [\delta\gamma \times]) \tag{92}$$

-continued $$\delta\gamma = \begin{bmatrix} \delta\phi \\ \delta\theta \\ \delta\psi \end{bmatrix}, \delta\psi = 0 \quad (93)$$

The vector notation of equation number 92 is typical for full, three-axis rotations and is used here for convenience with the assumption that the error in the rotation around the z axis is always zero by definition of the rotation from the body to the local tangent. A simple Extended Kalman Filter may be constructed to estimate the orientation state along with the velocity of the body relative to the inertial frame. The measured air relative velocity $V_{AB}{}^B$ is defined as the difference between the air mass motion velocity $V_A{}^B$ and the velocity of the body relative to the local tangent frame $V_B{}^B$ all of which are represented in the vehicle body frame.

$$V_{AB}{}^B = V_A{}^B - V_B{}^B \quad (94)$$

The scalar rate of change of altitude is equal to the vertical component of velocity represented in equation number 95.

$$\dot{h} = [0\ 0\ 1]C_B^T V_B^B \quad (95)$$

If a perturbation is defined in altitude such that true altitude is equal to the estimate plus the error, then it is possible to define the altitude error in terms of the error in velocity and orientation.

$$h = \bar{h} + \delta h \rightarrow \dot{h} = \dot{\bar{h}} + \delta\dot{h} \quad (96)$$

$$V_B^B = \bar{V}_B^B + \delta V_B \quad (97)$$

$$V_A^B = \bar{V}_A^B + \delta V_A \quad (98)$$

$$\dot{\bar{h}} + \delta\dot{h} = [0\ 0\ 1]C_B^T(I + [\delta\gamma \times])(\bar{V}_B^B + \delta V_B) \quad (99)$$

Separating a priori estimates from the posteriori ones, we find that:

$$\dot{\bar{h}} = [0\ 0\ 1]C_{\bar{B}}{}^T \bar{V}_B^B \quad (100)$$

$$\delta\dot{h} = [0\ 0\ 1]C_{\bar{B}}{}^T(\delta V_B - [\bar{V}_B^B \times]\delta\gamma) + \text{HOT's} \quad (101)$$

The result is that a new state space may be formed such that the states are defined as:

$$\delta x = \begin{bmatrix} \delta h \\ \delta V_B \\ \delta\phi \\ \delta\theta \\ \delta V_A^B \end{bmatrix} \quad (102)$$

The dynamics of the error propagation are defined as follows:

$$\begin{bmatrix} \delta\dot{h} \\ \delta\dot{V}_B \\ \delta\dot{\phi} \\ \delta\dot{\theta} \\ \delta\dot{V}_A^B \end{bmatrix} = \begin{bmatrix} 0 & [0\ 0\ 1]C_B^T & [0\ 0\ -1]C_B^T[\bar{V}_B^B \times]\begin{bmatrix}1\\0\\0\end{bmatrix} & [0\ 0\ -1]C_B^T[\bar{V}_B^B \times]\begin{bmatrix}0\\1\\0\end{bmatrix} & 0 \\ 0 & 0 & 0 & 0 & 0 \\ 0 & 0 & 0 & 0 & 0 \\ 0 & 0 & 0 & 0 & 0 \\ 0 & 0 & 0 & 0 & 0 \end{bmatrix} \begin{bmatrix} \delta h \\ \delta V_B \\ \delta\phi \\ \delta\theta \\ \delta V_A^B \end{bmatrix} \quad (103)$$

$$= \delta\dot{x}$$

$$= A\delta x$$

In order to enhance the filter structure, the dynamics of the velocity and attitudes may be assumed to be a random process in which Gaussian random noise stimulates the error in the velocities and attitudes. The new dynamics take the form of equation number 104 with matrix B defined in equation number 105 and noise vector w defined in equation number 106. Each of the noise terms is assumed zero mean. The covariance of w is referred to as W which is defined in equation number 107 containing the covariance of each of the independent noise terms defined.

$$\delta\dot{x} = A\delta x + Bw \quad (104)$$

$$B = \begin{bmatrix} 0 & 0 & 0 & 0 \\ I & 0 & 0 & 0 \\ 0 & 1 & 0 & 0 \\ 0 & 0 & 1 & 0 \\ 0 & 0 & 0 & I \end{bmatrix}_{9 \times 8} \quad (105)$$

$$w = \begin{bmatrix} w_{V_B} \\ w_\phi \\ w_\theta \\ w_{V_A} \end{bmatrix} \quad (106)$$

$$W = \begin{bmatrix} W_{V_B} & 0 & 0 & 0 \\ 0 & W_{\delta\phi} & 0 & 0 \\ 0 & 0 & W_{\delta\theta} & 0 \\ 0 & 0 & 0 & W_{V_A} \end{bmatrix} \quad (107)$$

A measurement function of the form in equation number 108 is defined and an Extended Kalman Filter is formed to estimate the state space. In this case, the measurement consists of all of the pressure measurements defined previously and a new Taylor's series expansion is defined around the state space with new pressure function defined in equation number 109.

$$\tilde{y} = \bar{y} + C\delta x + v \tag{108}$$

$$\tilde{p}_i = f((V_A^B - V_B^B), h, l_i) + v_i \tag{109}$$

Clearly the methods presented previously enable the deconstruction of the pressure into the form of equation number 109 since previously angle of attack, sideslip, Mach number and static pressure were estimated and can easily be converted to a relative velocity and altitude estimate using the methods presented previously. Taking perturbations again around the nominal condition, it is possible to define the measurement function to first order as shown in equation number 110.

$$\tilde{p}_i = f_P\left((\bar{V}_A^B - \bar{V}_B^B), \bar{h}, l_i\right) + \left.\frac{\partial f_P}{\partial (V_A^B - V_B^B)}\right|_{(\bar{V}_A^B - \bar{V}_B^B), \bar{h}, l_i} (\delta V_A - \delta V_B) + \\ \left.\frac{\partial f_P}{\partial (h)}\right|_{(\bar{V}_A^B - \bar{V}_B^B), \bar{h}, l_i} \delta h + v_i + HOTs \tag{110}$$

The measurement matrix C in the model of equation number 108 is therefore defined as in equation number 107 with values defined in equation number 111 with values defined in equation numbers 112 and 113. Clearly, these may be calibrated directly from a wind tunnel or else derived from the sensitivity matrices determined in the previous sections.

$$C_i = [\; C_{hi} \quad C_{Vi} \quad 0 \quad 0 \quad -C_{Vi} \;] \tag{111}$$

$$C_{hi} = \left.\frac{\partial f_{pi}}{\partial (h)}\right|_{(\bar{V}_A^B - \bar{V}_B^B), \bar{h}, l_i} \tag{112}$$

$$C_{Vi} = \left.\frac{\partial f_{pi}}{\partial (V_A^B - V_B^B)}\right|_{(\bar{V}_A^B - \bar{V}_B^B), \bar{h}, l_i} \tag{113}$$

The a priori condition is then $\bar{y} = f_P((\bar{\nabla}_A^B - \bar{\nabla}_B^B), \bar{h}, l_i)$.

The extended Kalman Filter Equations are then updated at every time step when a new set of pressure measurements are available. Given initial state estimate $\bar{x}$ with uncertainty M the Kalman filter equations are updated with a new measurement $\tilde{y}$ consisting of all the available (or fault-free) pressure measurements.

$$K = MC^T(V + CMC^T)^{-1} \tag{114}$$

$$P = M - KCM \tag{115}$$

$$\delta x = K(\tilde{y} - \bar{y}) \tag{116}$$

$$\hat{x} = \bar{x} + \delta \hat{x} \tag{117}$$

Then the state is propagated forward in time to the next time step using the Extended Kalman Filter propagation equations.

$$\Phi(\Delta t) = e^{A\Delta t} \approx I + A\Delta T \tag{118}$$

$$\Gamma = \int_t^{t+\Delta t} e^{A\tau} B d\tau \approx \left(I\Delta t + A\frac{\Delta t^2}{2}\right) B \tag{119}$$

$$M = \Phi P \Phi^T + \Gamma W \Gamma^T \tag{120}$$

Since the state dynamics are so simple, only altitude must be updated over time by first calculating the derivative and then numerically integrating the derivative over the time step using a Runge-Kutta or other appropriate method. In this case, simple Euler integration is depicted.

$$\dot{\bar{h}} = [0\; 0\; 1] C_B^T \hat{V}_B^B \tag{121}$$

$$\bar{h}(t+\Delta t) = \bar{h}(t) + \dot{\bar{h}}\Delta t \tag{122}$$

In the present case the values for $C_B^T$, $\hat{V}_B^B$ and $\bar{h}$ are extracted from the updated state estimate $\hat{x}$. The next state estimate $\bar{x}$ is constructed by copying $\hat{x}$ into $\bar{x}$ but replacing $\bar{h}$ with $\bar{h}$ from equation number 122.

In this way, the orientation of the drogue may be determined through this simple EKF process. The filter is weakly observable, however this weakness may be overcome by commanding increased drag to modulate altitude which will work so long as the dynamic motion is in a nearly steady state, the aerodynamics of the vehicle are known well enough to estimate the static pressure, and the pressure sensors are sensitive enough to detect the static pressure gradient from the motion of the drogue. The alternative way to improve the estimation is to include an inertial navigation unit which is discussed in the next section.

An alternative form of the filter is developed based on using rate gyros either as measurements or as inputs. If the gyros are utilized as measurements, the state is augmented with two additional angular rate error terms, $\delta\omega_x$ and $\delta\omega_y$. The error dynamics are modified to include the error growth in attitude as a function of the error in the angular rates. The gyro measurements measure these terms directly and would be utilized as additional measurements in the EKF format. Only two gyro measurements, one about the pitch axis, one about the body roll axis are required. Alternatively, the gyros may be utilized to integrate the pitch and roll which is then corrected by the EKF defined.

In a second form, the accelerometers may be utilized to help estimate the velocity component. However, this is a subset of the IMU configuration defined in the next section where the angular velocity measurements are excluded from the inputs.

Another alternative form of the filter is to include the calibrated aerodynamic forces and moments into the dynamics to further enhance the fidelity of the filter which is discussed in the next section.

2.5 Air Data and Inertial Fusion

Inertial measurements may be utilized to estimate the position, velocity, and attitude of the body relative to the inertial frame. The inertial measurement unit (IMU) provides measurements of acceleration and angular rate. These may be integrated using the strap down equations of motion to estimate the position, velocity, and attitude of the body.

The primary forces acting on the vehicle in this case are summarized as follows:

$$\Sigma F = mA_{IB}^E = mg^E + C_B^E F_d^B + C_B^E F_{Aero}^B + m[\omega_{IE}^E \times] \\ [\omega_{IE}^E \times] P^E + 2m[\omega_{IE}^E \times] V^E \tag{123}$$

The sum of the forces are equal to the mass of the vehicle m multiplied by the vehicle vector acceleration relative to the inertial frame $A_{IB}^E$ represented in the Earth-Centered-Earth-Fixed (ECEF) Frame. This term is equal to the different inertial forces acting on the body including gravity $g^E$ represented in the ECEF frame, disturbances forces $F_d^B$ in the body frame such as those created by a tether attached at a point to the body, the aerodynamic forces $F_{Aero}^B$ as well as the centripetal and Coriolis accelerations due to the rotation of the Earth relative to the inertial frame. The term $P^E$ represents the position vector of the body relative to the center of the Earth in the ECEF frame. Likewise $V^E$ represents the vector velocity of the body relative to the ECEF frame. The term $\omega_{IE}^E$ represents the rotation of the Earth relative to the inertial frame. All of these forces are sensed by accelerometers. The accelerations represented here may be taken at a known reference point fixed relative to the body. The gravity term operates on the center of gravity while the aerodynamic terms operate on the center of pressure. The disturbance forces operate on a third point relative to the reference point. Each of these forces induces a moment on the vehicle in addition to any other moments.

The total moments acting at the reference location is equal to the inertial frame multiplied by the angular acceleration as shown in the following equation:

$$\Sigma M = I_{BB}^B \alpha_{IB\_cp}^B = l_d \times F_d^B + F_{Aero}^B + M_{Aero}^B - l_{cg} \times mg^E - ([\omega_{IB}^B \times] I_{BB}^B \omega_{IB}^B) \quad (124)$$

In this case the moments are defined at the center of pressure of the drogue (cp), the lever $l_d$ is the vector from the cp to the disturbance input such as the tether connection, the lever $l_{cg}$ is the lever from the cp to the center of gravity (cg), and $M_{Aero}^B$ represent the vector of rotational moments that the aerodynamics induce on the vehicle. Alternative locations may be chosen in other examples.

The inertial angular velocity in the body frame $\omega_{IB}^B$ couples into the moments in equation number 124. It is noted that the inertial angular velocity has three components, the Earth rate $\omega_{IE}^E$, the rate of change of the tangent frame $\omega_{ET}^T$, and the body to the tangent frame $\omega_{TB}^B$. The relationship is defined in equation number 125.

$$\omega_{IB}^B = \omega_{IE}^E + \omega_{ET}^T + \omega_{TB}^B \quad (125)$$

The aerodynamic forces were defined in equation number 89 in the body frame as well as the representation in the local tangent frame. The moments are defined in the following equation:

$$\begin{bmatrix} \bar{p}_s S b C_l \\ \bar{p}_s S \bar{c} C_m \\ \bar{p}_s S b C_n \end{bmatrix} = M_{Aero} \quad (126)$$

In equation number 126, b is the drogue span and $\bar{c}$ is the drogue mean chord. The coefficients for rolling moment $C_l$, pitching moment $C_m$, and yawing moment $C_n$ are to be defined functions of Mach number, angle of attack, sideslip, and actuator deflection. These functions are derived as part of wind tunnel, computational fluid dynamics, or experimental results.

$$C_l = f_l(M, \alpha, \beta, \delta v_1, \ldots, \delta v_N) \quad (127)$$

$$C_m = f_m(M, \alpha, \beta, \delta v_1, \ldots, \delta v_N) \quad (128)$$

$$C_n = f_n(M, \alpha, \beta, \delta v_1, \ldots, \delta v_N) \quad (129)$$

The actuator deflection values $\delta v_i$ represent the canopy deflection commands or other aerodynamic commands for all N actuators.

Two methods may be suggested for improving the EKF structure presented in the previous section. The first method is to utilize the aerodynamic force and moment models and integrate through the EKF previously defined. This method may be enhanced by the use of angular rate gyros to correct the estimates. The second method is to utilize the outputs of an inertial measurement unit (IMU) as the inputs to the filter structure.

Figure 8:
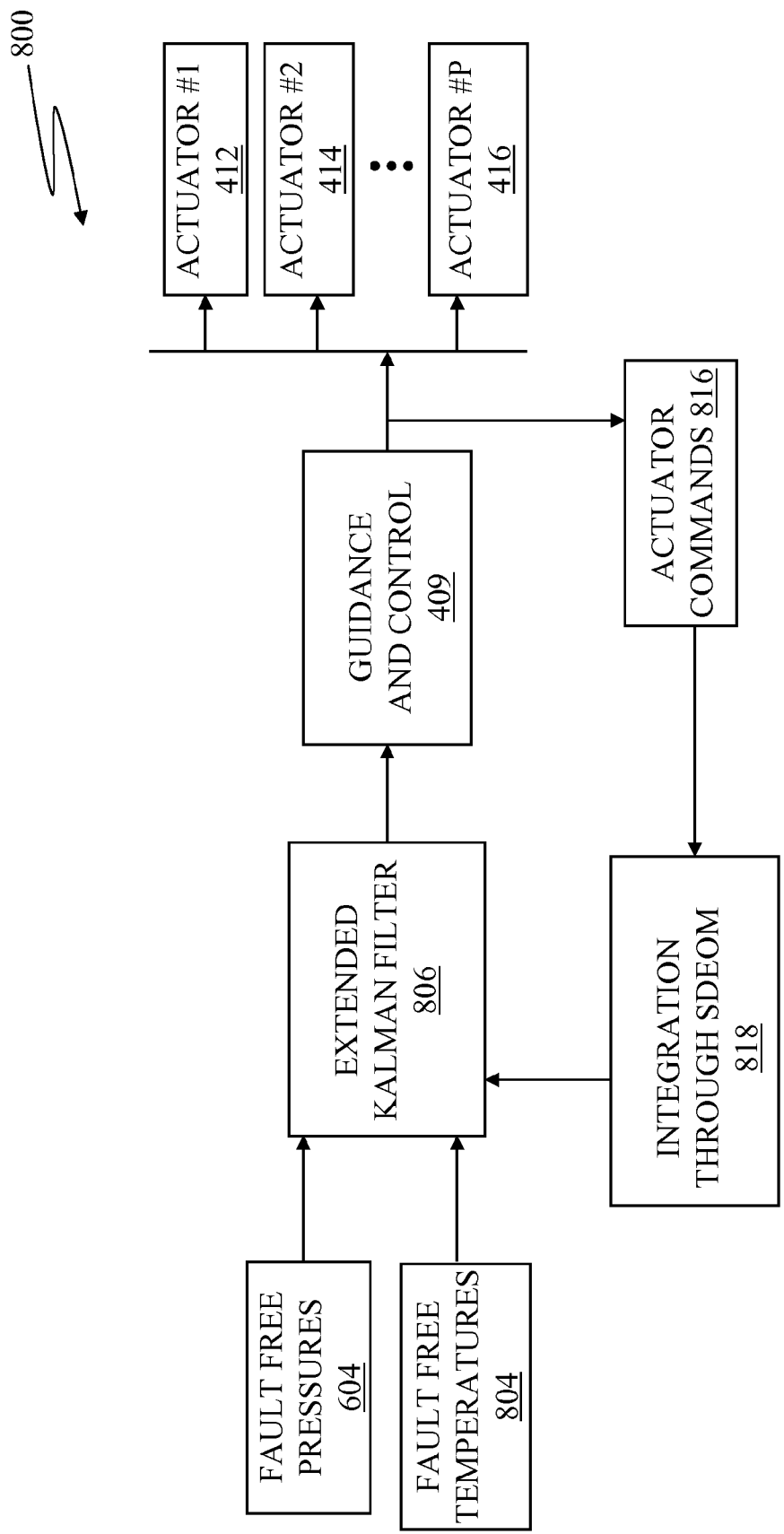
FIG. 8 shows a basic block diagram of a simplified filter structure.

For the first method, the nonlinear integration may be performed by first calculating the aerodynamic forces and moments. FIG. 8 shows the basic functional block diagram 800. The pressures 604 and temperature measurements 804 are used to correct the navigation state of the vehicle through an Extended Kalman Filter 806 and the state is passed to the guidance and control system 409. The actuator commands 816 are utilized along with the knowledge of the aerodynamic forces and moments acting on the drogue to integrate the forces and moments generated by the actuators 412, 414, 416 to propagate 818 the state to the next time step at which time the process repeats. The navigation state space x is defined as $$x = \begin{bmatrix} P^E \\ V_B^E \\ Q_B^E \\ \omega_{IB}^B \\ V_A^B \\ A_A^B \end{bmatrix} \quad (130)$$

The new terms included in the state are the orientation quaternion $Q_B^E$ from the body to the ECEF frame and the angular velocity from the inertial to the body frame in the body frame $\omega_{IB}^B$. The time derivative of the angular velocity is given by the following:

$$\dot{\omega}_{IB}^B = (I_{BB}^B)^{-1}(l_d \times F_d^B + M_{Aero}^B - l_{cg} \times mg^E - ([\omega_{IB}^B \times] I_{BB}^B \omega_{IB}^B)) \quad (131)$$

The time rate of change of attitude is given by:

$$\dot{Q}_B^E = \frac{1}{2} \begin{bmatrix} 0 & -p & -q & -r \\ p & 0 & r & -q \\ q & -r & 0 & p \\ r & q & -p & 0 \end{bmatrix} Q_B^E \quad (132)$$

Where $$\omega_{EB}^B = \begin{bmatrix} p \\ q \\ r \end{bmatrix} = \omega_{IB}^B - \omega_{IE}^E \quad (133)$$

The time rate of change of velocity is given by:

$$\dot{V}^E = g^E + \frac{1}{m} C_B^E F_d^B + \frac{1}{m} C_B^E F_{Aero}^B - [\omega_{IE}^E \times][\omega_{IE}^E \times] P^E - 2[\omega_{IE}^E \times] V^E \quad (134)$$

We note that $V^B = C_E^B V^E$. It is also convenient to mention that a known relationship exists, such that $Q_B^E$ and $C_B^E$ are interchangeable. In order to estimate the rotation from tangent to Earth, the position vector $P^E$ must be known. The position time rate of change is:

$$\dot{P}^E = \dot{V}^E \quad (135)$$

The wind states are assumed a first order integration driven by noise. For now, it is assumed that the velocity is the integral of acceleration.

$$\dot{V}_{AB}^B = A_{AB}^B \quad (136)$$

From this set of nonlinear dynamics, a set of perturbed dynamics may be formed and an Extended Kalman Filter utilized to correct the solution. As before, the pressure sensors provide the primary means of estimation and the filter requires knowledge of the actuator commands $\delta v_i$ in order to propagate the state from time step to time step.

An error state is defined as the linear error in each of the state variables. In this case, the error perturbation is defined as $\delta x$ with definition in equation number 137.

$$\delta x = \begin{bmatrix} \delta P^E \\ \delta V_B^E \\ \delta q \\ \delta \omega \\ \delta V_A^B \\ \delta A_A^B \end{bmatrix} \quad (137)$$

Each of the position and velocity terms in equation number 137 is defined using a linear function of the truth minus the current estimate.

$$\delta P^E = P^E - \overline{P}^E \rightarrow P^E = \overline{P}^E + \delta P^E$$

$$\delta V_B^E = V_B^E - \overline{V}_B^E \rightarrow V_B^E = \overline{V}_B^E + \delta V_B^E$$

$$\delta V_A^B = V_A^B - \overline{V}_A^B \rightarrow V_A^B = \overline{V}_A^B + \delta V_A^B \quad (138)$$

The rotation error $\delta q$ is defined using the following nonlinear transformation in which $C_B^E$ is the cosine rotation from the body to ECEF frame, $\overline{C}_B^E$ is the estimate of the rotation matrix and associated Quaternion error vector $\delta q$ is a 3×1 vector of the errors about the x, y, and z axes.

$$C_B^E = \overline{C}_B^E C_B^{\overline{B}} = \overline{C}_B^E (I + 2[\delta q \times]) \quad (139)$$

The angular velocity error is defined linearly.

$$\delta \omega = \omega_{IB}^B - \overline{C}_B^B \overline{\omega}_{IB}^{\overline{B}} \rightarrow \omega_{IB}^B = \overline{C}_B^B \overline{\omega}_{IB}^{\overline{B}} + \delta \omega \approx (I - [\delta q \times]) \overline{\omega}_{IB}^{\overline{B}} + \delta \omega \quad (140)$$

The wind states assume a first order integration driven by white noise $w_{air}$ assumed to be a zero mean, Gaussian process with covariance $E[w_{air} w_{air}^T] = W_{air}$.

$$V_A^B = \overline{V}_A^B + \delta V_A^B$$

$$A_A^B = w_{Air} \quad (141)$$

These definitions are substituted into the nonlinear dynamics previously defined in order to determine a linearized set of error dynamics used to define an Extended Kalman Filter. The EKF will be utilized to estimate the state $\delta x$. The time derivative of the position perturbation $\delta P^E$ is determined from equation number 135.

$$\delta \dot{P}_B^E = \delta V_B^E \quad (142)$$

In order to estimate the time rate of change of the velocity error $\delta \dot{V}^E$, equation number 123 must be re-arranged in terms of velocity and perturbations taken about the different forces. Deriving the perturbations about the aerodynamic forces and moments takes a significant amount of effort. Each aerodynamic force is a function of Mach number, angle of attack, angle of sideslip, and each control surface. The aerodynamic forces are repeated herewith $p_s$ representing the total pressure and S representing a reference area of the drogue, and each of the coefficients defined as the functions in equation number 144.

$$F_{Aero}^B = \begin{bmatrix} C_D p_s S \\ -C_L p_s S \\ C_y p_s S \end{bmatrix} \quad (143)$$

$$C_D = f_D(M, \alpha, \beta, \delta v_1, \ldots \delta v_N) \quad (144)$$
$$C_L = f_L(M, \alpha, \beta, \delta v_1, \ldots \delta v_N)$$
$$C_y = f_y(M, \alpha, \beta, \delta v_1, \ldots \delta v_N)$$

Each of the terms in equation number 144 can be linearized around each of the independent parameters using a Taylor's series expansion. Typically, the lift coefficient for aircraft is defined using a linear perturbation as shown in equation number 145. Note that each term remains a function of Mach number. Each coefficient is a function of Mach number and the value of each coefficient is usually determined from a look-up table or functional fit of experimental data or wind tunnel data at various Mach numbers. The angle of attack rate $\dot\alpha$ has been added to compensate for acceleration effects.

$$C_L \approx C_{L0}(M) + C_{L\alpha}(M)\alpha + C_{L\dot\alpha}(M)\dot\alpha + \sum_{i=1}^{N} C_{Lvi}(M)\delta v_i \quad (145)$$

Clearly, perturbation definitions are required for angle of attack and angle of sideslip. In terms of a state space defined perturbation, first the perturbation in the air velocity vector is defined.

$$V_{AB}^B = \overline{V}_{AB}^B + \delta V_{AB}^B = \overline{C}_B^E (I + 2[\delta q \times])(\overline{V}_B^E + \delta V_B^E) - (\overline{V}_A^B + \delta V_A^B) \quad (146)$$

The a priori value of the relative velocity of the body to the air mass motion is therefore:

$$\overline{V}_{AB}^B = \overline{C}_B^E \overline{V}_B^E - \overline{V}_A^B \quad (147)$$

The error in the estimate of relative velocity (ignoring cross terms in perturbation errors) is:

$$\delta V_{AB}^B = \overline{C}_B^E \delta V_B^E - 2\overline{C}_B^E [\overline{V}_B^E \times] \delta q - \delta V_A^B \quad (148)$$

For the present case, we assume that the definitions for angle of sideslip and angle of attack are given by equation number 4 and 5, respectively. Given these definitions, it is possible to derive the perturbation of the angle of attack as a function of the relative velocity perturbation defined. If this is done, then the following perturbation of angle of attack holds:

$$\alpha = \overline{\alpha} + \delta\alpha \quad (149)$$

$$\delta\alpha = \frac{1}{\left((\overline{V}_{AB}^{Bx})^2 + (\overline{V}_{AB}^{Bz})^2\right)^{3/2}} \begin{bmatrix} -\overline{V}_{AB}^{Bx} \overline{V}_{AB}^{Bz} & 0 & (\overline{V}_{AB}^{Bx})^2 \end{bmatrix} \delta V_{AB}^B$$

$$= \frac{1}{\left((\overline{V}_{AB}^{Bx})^2 + (\overline{V}_{AB}^{Bz})^2\right)^{3/2}} \begin{bmatrix} -\overline{V}_{AB}^{Bx} \overline{V}_{AB}^{Bz} & 0 & (\overline{V}_{AB}^{Bx})^2 \end{bmatrix}$$

$$\begin{pmatrix} \overline{C}_B^E \delta V^E - \\ 2\overline{C}_B^E [\overline{V}_B^E \times] \delta q - \delta V_A^B \end{pmatrix}$$

$$= A_{\alpha V_B^E} \delta V^E + A_{\alpha q} \delta q + A_{\alpha V_A^B} \delta V_A^B$$

$$A_{\alpha V_B^E} = \frac{1}{\left((\overline{V}_{AB}^{Bx})^2 + (\overline{V}_{AB}^{Bz})^2\right)^{3/2}} \begin{bmatrix} -\overline{V}_{AB}^{Bx} \overline{V}_{AB}^{Bz} & 0 & (\overline{V}_{AB}^{Bx})^2 \end{bmatrix} \overline{C}_B^E \quad (150)$$

-continued $$A_{\alpha q} = \frac{-2}{\left(\left(\overline{V}_{AB}^{Bx}\right)^2 + \left(\overline{V}_{AB}^{Bz}\right)^2\right)^{3/2}} \begin{bmatrix} -\overline{V}_{AB}^{Bx}\overline{V}_{AB}^{Bz} \\ 0 & \left(\overline{V}_{AB}^{Bx}\right)^2 \end{bmatrix} C_B^E[\overline{V}_B^E \times] \quad (151)$$

$$A_{\alpha V_A^B} = \frac{-1}{\left(\left(\overline{V}_{AB}^{Bx}\right)^2 + \left(\overline{V}_{AB}^{Bz}\right)^2\right)^{3/2}} \begin{bmatrix} -\overline{V}_{AB}^{Bx}\overline{V}_{AB}^{Bz} & 0 & \left(\overline{V}_{AB}^{Bx}\right)^2 \end{bmatrix} \quad (152)$$

A similar line of reasoning leads to a derivation for the perturbation in angle of side slip as a function of the perturbation in the relative velocity error:

$$\beta = \overline{\beta} + \delta\beta \quad (153)$$

$$\delta\beta =$$

$$\frac{1}{\left(\|\overline{V}_{AB}^B\|\right)^3} \begin{bmatrix} -\overline{V}_{AB}^{Bx}\overline{V}_{AB}^{By} & \left(\left(\overline{V}_{AB}^{Bx}\right)^2 + \left(\overline{V}_{AB}^{Bz}\right)^2\right) & -\overline{V}_{AB}^{Bz}\overline{V}_{AB}^{By} \end{bmatrix} \delta V_{AB}^B$$

$$= \frac{1}{\left(\|\overline{V}_{AB}^B\|\right)^3} \begin{bmatrix} -\overline{V}_{AB}^{Bx}\overline{V}_{AB}^{By} & \left(\left(\overline{V}_{AB}^{Bx}\right)^2 + \left(\overline{V}_{AB}^{Bz}\right)^2\right) & -\overline{V}_{AB}^{Bz}\overline{V}_{AB}^{By} \end{bmatrix}$$

$$\begin{pmatrix} C_B^E \delta V_B^E - \\ 2 C_B^E[\overline{V}_B^E \times]\delta q - \delta V_A^B \end{pmatrix}$$

$$= A_{\beta V_B^E} \delta V_B^E + A_{\beta q} \delta q + A_{\beta V_A^B} \delta V_A^B$$

$$A_{\beta V_B^E} = \frac{1}{\left(\|\overline{V}_{AB}^B\|\right)^3} \begin{bmatrix} -\overline{V}_{AB}^{Bx}\overline{V}_{AB}^{By} & \left(\left(\overline{V}_{AB}^{Bx}\right)^2 + \left(\overline{V}_{AB}^{Bz}\right)^2\right) & -\overline{V}_{AB}^{Bz}\overline{V}_{AB}^{By} \end{bmatrix} C_B^E \quad (154)$$

$$A_{\beta q} = \frac{-2}{\left(\|\overline{V}_{AB}^B\|\right)^3} \begin{bmatrix} -\overline{V}_{AB}^{Bx}\overline{V}_{AB}^{By} & \left(\left(\overline{V}_{AB}^{Bx}\right)^2 + \left(\overline{V}_{AB}^{Bz}\right)^2\right) & -\overline{V}_{AB}^{Bz}\overline{V}_{AB}^{By} \end{bmatrix} \quad (155)$$

$$C_B^E[\overline{V}_B^E \times]$$

$$A_{\beta V_A^B} = \frac{-1}{\left(\|\overline{V}_{AB}^B\|\right)^3} \begin{bmatrix} -\overline{V}_{AB}^{Bx}\overline{V}_{AB}^{By} & \left(\left(\overline{V}_{AB}^{Bx}\right)^2 + \left(\overline{V}_{AB}^{Bz}\right)^2\right) & -\overline{V}_{AB}^{Bz}\overline{V}_{AB}^{By} \end{bmatrix} \quad (156)$$

The rate of change of angle of attack requires that the relative acceleration be defined. The relative acceleration between the vehicle and the air mass motion is calculated by taking the time derivative of the relative air mass motion with respect to the inertial frame.

$$\dot{V}_{AB}^B = C_B^E \dot{V}_B^E + C_B^E[\omega_{EB}^B \times]V_B^E + \dot{V}_A^B$$

$$\dot{V}_{AB}^B = C_B^E(A_B^E + 2[\omega_{EB}^B \times]V_B^E) + A_A^B + [\omega_{IB}^B \times]V_A^B$$

$$\overline{\dot{V}}_{AB}^B + \delta\dot{V}_{AB}^B = C_B^E(I + 2[\delta q \times])( \\ \overline{A}_B^E + \delta A_B^E + 2[((I - 2[\delta q \times])\overline{\omega}_{EB}^B + \delta\omega) \times]( \\ \overline{V}_B^E + \delta V_B^E)) + \overline{A}_A^B + \delta A_A^B + [((I - 2[\delta q \times])\overline{\omega}_{IB}^B \\ + \delta\omega) \times](\overline{V}_A^B + \delta V_A^B) \quad (157)$$

The error in the acceleration of the wind state will be defined by noise process while the acceleration of the wind will be added to the state vector. The body acceleration will be provided by accelerometers on the body or by calculation of the forces using the aerodynamic controls while the error in the accelerations will represent noise in the accelerometers or uncertainty in the control position and effectiveness. Substituting the perturbed values into equation number 157 for each of the states and noting that $\omega_{EB}^B = \omega_{IB}^B - \omega_{IE}^E$ results in a perturbation value for the relative air mass motion acceleration.

$$\delta \dot{V}_{AB}^B = C_E^B[(\overline{\omega}_{EB}^B + \omega_{IE}^E) \times]\delta V_B^E + [\overline{\omega}_{IB}^B \times]\delta V_A^B + \quad (158)$$

$$2(C_E^B[(\overline{\omega}_{EB}^B \times \overline{V}_{AB}^B) \times] + C_E^B[(\overline{A}_B^E + (\omega_{IE}^E \times \overline{V}^E)) \times] + [\overline{A}_A^B \times])$$

$$\delta q - [(C_E^B \overline{V}_B^E - \overline{V}_A^B) \times]\delta\omega + \delta A_A^B + C_E^B \delta A_B^E$$

It is seen in equation number 158 that the error in the relative acceleration is a function of the error in the estimated relative velocities, the attitude error, and the angular velocity errors. The angle of attack angular velocity is therefore defined as:

$$\dot{\alpha} = \overline{\dot{\alpha}} + \delta\dot{\alpha} \quad (159)$$

$$\delta\dot{\alpha} = \begin{bmatrix} -\overline{A}_{AB}^{Bz} & 0 & -\overline{A}_{AB}^{Bx} \end{bmatrix} \delta V_{AB}^B + \begin{bmatrix} -\overline{V}_{AB}^{Bz} & 0 & -\overline{V}_{AB}^{Bx} \end{bmatrix} \delta\dot{V}_{AB}^B$$

$$= A_{\dot{\alpha} V_B^E} \delta V_B^E + A_{\dot{\alpha} A_B^E} \delta A_B^E + A_{\dot{\alpha} q} \delta q + A_{\dot{\alpha} \omega} \delta\omega +$$

$$A_{\dot{\alpha} V_A^B} \delta V_A^B + A_{\dot{\alpha} A_A^B} \delta A_A^B$$

$$A_{\dot{\alpha} V_B^E} = \begin{bmatrix} -\overline{A}_{AB}^{Bz} & 0 & -\overline{A}_{AB}^{Bx} \end{bmatrix} \quad (160)$$

$$C_B^E + \begin{bmatrix} -\overline{V}_{AB}^{Bz} & 0 & -\overline{V}_{AB}^{Bx} \end{bmatrix} C_E^B[(\overline{\omega}_{EB}^B + \omega_{IE}^E) \times]$$

$$A_{\dot{\alpha} A_B^E} = \begin{bmatrix} -\overline{V}_{AB}^{Bz} & 0 & -\overline{V}_{AB}^{Bx} \end{bmatrix} C_B^E \quad (161)$$

$$A_{\dot{\alpha} q} = -2\begin{bmatrix} -\overline{A}_{AB}^{Bz} & 0 & -\overline{A}_{AB}^{Bx} \end{bmatrix} C_B^E[\overline{V}_B^E \times] + \begin{bmatrix} -\overline{V}_{AB}^{Bz} & 0 & -\overline{V}_{AB}^{Bx} \end{bmatrix} 2 \quad (162)$$

$$(C_E^B[(\overline{\omega}_{EB}^B \times \overline{V}_{AB}^B) \times] + C_E^B[(\overline{A}_B^E + (\omega_{IE}^E \times \overline{V}^E)) \times] + [\overline{A}_A^B \times])$$

$$A_{\dot{\alpha}\omega} = -\begin{bmatrix} -\overline{V}_{AB}^{Bz} & 0 & -\overline{V}_{AB}^{Bx} \end{bmatrix} [(C_E^B \overline{V}_B^E - \overline{V}_A^B) \times] \quad (163)$$

$$A_{\dot{\alpha} V_A^B} = -\begin{bmatrix} -\overline{A}_{AB}^{Bz} & 0 & -\overline{A}_{AB}^{Bx} \end{bmatrix} + \begin{bmatrix} -\overline{V}_{AB}^{Bz} & 0 & -\overline{V}_{AB}^{Bx} \end{bmatrix} [\overline{\omega}_{IB}^B \times] \quad (164)$$

$$A_{\dot{\alpha} A_A^B} = \begin{bmatrix} -\overline{V}_{AB}^{Bz} & 0 & -\overline{V}_{AB}^{Bx} \end{bmatrix} \quad (165)$$

In this case, the relative acceleration terms are calculated using the a priori estimates.

$$\overline{A}_{AB}^B = C_E^B \overline{A}_B^E - \overline{A}_A^E = \begin{bmatrix} \overline{A}_{AB}^{Bx} \\ \overline{A}_{AB}^{By} \\ \overline{A}_{AB}^{Bz} \end{bmatrix} \quad (166)$$

The perturbation in Mach number may be defined as follows:

$$M = \overline{M} + \delta M \quad (167)$$

$$\overline{M} = \frac{\|\overline{V}_{AB}^B\|}{\sqrt{kRT_0(\overline{h})}}$$

$$\delta M = \frac{[1 \quad 1 \quad 1]}{\|\overline{V}_{AB}^B\|\sqrt{kRT_0(\overline{h})}} C_B^E \delta V_B^E - \frac{[1 \quad 1 \quad 1]}{\|\overline{V}_{AB}^B\|\sqrt{kRT_0(\overline{h})}} \delta V_A^B +$$

$$\frac{2[1 \quad 1 \quad 1]}{\|\overline{V}_{AB}^B\|\sqrt{kRT_0(\overline{h})}} C_E^B[\overline{V}_{AB}^B \times]\delta q -$$

$$\frac{\|\overline{V}_{AB}^B\|}{(kRT_0(\overline{h}))^{3/2}} \left(\frac{\partial T_0}{\partial h}\bigg|_{\partial h=\overline{h}}\right) \delta h$$

$$= A_{MV_B^E} \delta V_B^E + A_{Mq} \delta q + A_{MV_A^B} \delta V_A^B + A_{Mh} \delta h$$

$$A_{MV_B^E} = \frac{[1 \quad 1 \quad 1]}{\|\overline{V}_{AB}^B\|\sqrt{kRT_0(\overline{h})}} C_E^B \quad (168)$$

$$A_{Mq} = \frac{2[1 \quad 1 \quad 1]}{\|\overline{V}_{AB}^B\|\sqrt{kRT_0(\overline{h})}} C_E^B[\overline{V}_{AB}^B \times] \quad (169)$$

-continued $$A_{MV_A^B} = \frac{[1\ 1\ 1]}{\|\overline{V}_{AB}^B\|\sqrt{kRT_0(\overline{h})}} \quad (170)$$

$$A_{Mh} = \frac{\|\overline{V}_{AB}^B\|}{(kRT_0(\overline{h}))^{3/2}} \left(\frac{\partial T_0}{\partial h}\bigg|_{\partial h=\overline{h}}\right) \quad (171)$$

This expression shows that Mach number is influenced by the error in the attitude of the vehicle with respect to air mass motion. It is also assumed that $$\left(\frac{\partial T_0}{\partial h}\bigg|_{\partial h=\overline{h}}\right),$$

the variation of static Temperature $T_0$ as a function of the a priori altitude $\overline{h}$ is known which can be computed from the 1976 standard atmosphere either analytically or through a numerical perturbation about a set altitude.

Therefore, the lift coefficient of equation number 145 may now be re-defined in terms of the perturbations around each state to first order using a Taylor's series expansion in equation number 172 where higher order terms have been neglected.

$$C_L \approx \overline{C}_L + \delta C_L \quad (172)$$

$$\overline{C}_L = C_{L0}(\overline{M}) + C_{L\alpha}(\overline{M})\overline{\alpha} + C_{L\dot\alpha}(\overline{M})\dot{\overline\alpha} + \sum_{i=1}^{N} C_{Lvi}(\overline{M})\delta\overline{v}_i$$

$$\delta C_L = \left(\frac{\partial C_{L0}}{\partial M} + \frac{\partial C_{L\alpha}}{\partial M}\overline{\alpha} + \frac{\partial C_{L\dot\alpha}}{\partial M}\dot{\overline\alpha} + \sum_{i=1}^{N} \frac{\partial C_{Lvi}}{\partial M}\delta\overline{v}_i\right)\delta M +$$

$$C_{L\alpha}(\overline{M})\delta\alpha + C_{L\dot\alpha}(\overline{M})\delta\dot\alpha + \sum_{i=1}^{N} C_{Lvi}(\overline{M})\delta e_{vi}$$

$$= C_{L\delta M}\delta M + C_{L\alpha}(\overline{M})\delta\alpha + C_{L\dot\alpha}(\overline{M})\delta\dot\alpha + \sum_{i=1}^{N} C_{Lvi}(\overline{M})\delta e_{vi}$$

$$C_{L\delta M} = \left(\frac{\partial C_{L0}}{\partial M} + \frac{\partial C_{L\alpha}}{\partial M}\overline{\alpha} + \frac{\partial C_{L\dot\alpha}}{\partial M}\dot{\overline\alpha} + \sum_{i=1}^{N} \frac{\partial C_{Lvi}}{\partial M}\delta\overline{v}_i\right) \quad (173)$$

The term for the error in the actuator position is defined as shown in equation number 174 and will be considered a white noise process $w_{vi}$ that is zero mean with covariance $E[w_{vi} w_{vi}^T] = W_{vi}$ where it is inherently assumed that this noise process is independent from all other noise sources including the other actuators.

$$\delta e_{vi} = \delta v_i - \delta\overline{v}_i = w_{vi} \quad (174)$$

Therefore, the error in the lift coefficient as a function of the state is found by substituting equations 149, 158, and 167.

$$\delta C_L = \left(C_{L\delta M}A_{MV_B^E} + C_{L\alpha}(\overline{M})A_{\alpha V_B^E} + C_{L\dot\alpha}(M)A_{\dot\alpha V_B^E}\right)\delta V^E + \quad (175)$$

$$(C_{L\delta M}A_{Mh})\delta h + (C_{L\delta M}A_{Mq} + C_{L\alpha}(\overline{M})A_{\alpha q} + C_{L\dot\alpha}(\overline{M})A_{\dot\alpha q})\delta q +$$

$$(C_{L\dot\alpha}(\overline{M})A_{\dot\alpha\omega})\delta\omega +$$

$$\left(C_{L\delta M}A_{MV_A^B} + C_{L\alpha}(\overline{M})A_{\alpha V_A^B} + C_{L\dot\alpha}(\overline{M})A_{\dot\alpha V_A^B}\right)\delta V_A^B +$$

$$\left(C_{L\dot\alpha}(\overline{M})A_{\alpha A_B^E}\right)\delta A_B^E + \left(C_{L\dot\alpha}(\overline{M})A_{\alpha A_A^B}\right)\delta A_A^B + \sum_{i=1}^{N} C_{Lvi}(\overline{M})\delta e_{vi}$$

Note that ultimately similar expressions may be derived for the drag, side force, and each of the moments using the definitions provided. Returning to the original velocity equation in equation number 134, perturbations may be taken to define the error in the velocity.

$$\delta V_B^E = \left(\frac{\partial g^E}{\partial P^E} - [\omega_{IE}^E \times][\omega_{IE}^E \times]\right)\delta P^E - 2[\omega_{IE}^E \times]\delta V_B^E - \quad (176)$$

$$2\left(\frac{1}{m}C_B^E[\overline{F}_{Aero}^B \times]\right)\delta q + \left(\frac{1}{m}C_B^E\delta F_{Aero}^B\right) + \frac{1}{m}C_B^E F_d$$

In this case, the gravity gradient with respect to position is given by:

$$\frac{\partial g^E}{\partial P^E}$$

and is calculated based on a gravity model in the J2 gravity model. The value for the a priori aerodynamic effects are defined using the a priori estimates.

$$\overline{F}_{Aero}^B = \begin{bmatrix} \overline{C}_D \overline{p}_s S \\ -\overline{C}_L \overline{p}_s S \\ \overline{C}_y \overline{p}_s S \end{bmatrix} \quad (177)$$

$$\overline{C}_D = f_D(\overline{M}, \overline\alpha, \overline\beta, \delta\overline{v}_1, \ldots \delta\overline{v}_N) \quad (178)$$
$$\overline{C}_L = f_L(\overline{M}, \overline\alpha, \overline\beta, \delta\overline{v}_1, \ldots \delta\overline{v}_N)$$
$$\overline{C}_y = f_y(\overline{M}, \overline\alpha, \overline\beta, \delta\overline{v}_1, \ldots \delta\overline{v}_N)$$

Note that the values for the a priori Mach number, pressures, angle of attack and sideslip may be calculated using the a priori velocity and altitude calculations as defined previously. The control inputs are assumed known from the control system, for this example. The perturbation in the forces is defined by the set of perturbed coefficients.

$$\delta F_{Aero}^B = \begin{bmatrix} \delta C_D \overline{p}_s S \\ -\delta C_L \overline{p}_s S \\ \delta C_y \overline{p}_s S \end{bmatrix} \quad (179)$$

In this case, the value for $\delta C_L$ as a function of the state error is defined explicitly in equation number 175 and similar perturbations are derived for each of the other forces using the same definitions used to define $\delta C_L$. Disturbance forces $F_d$ are defined as white noise input with $\overline{F}_d = w_d$ as a zero mean input and covariance $E[w_d w_d^T] = W_d$.

From the moment equation in equation number 131, the perturbed angular acceleration takes the form:

$$\delta\dot\omega_{IB}^B = (I_{BB}^B)^{-1}\left(l_d \times F_d^B + \delta M_{Aero}^B - l_{cg} \times m\frac{\partial g^E}{\partial P^E}\delta P^E - \right. \quad (180)$$
$$\left. ([I_{BB}^B \overline\omega_{IB}^B \times] - [\overline\omega_{IB}^B \times]I_{BB}^B)\delta\omega_{IB}^B\right)$$

The terms have all been defined previously with the exception of the perturbation in the aerodynamic moments. Note that equation number 180 is taken at the point of application of the aerodynamic forces and that the lever arms are defined relative to this point. This location is somewhat arbitrary and the same basic process would hold if the moments were calculated at a different point on the body with the exception that the aerodynamic forces and perturbed aerodynamic forces would need to be added to equation number 180 modified by the appropriate lever arm. The perturbed moments are defined as:

$$\delta M_{Aero} = \begin{bmatrix} \bar{p}_s S b \delta C_l \\ \bar{p}_s S \bar{c} \delta C_m \\ \bar{p}_s S b \delta C_n \end{bmatrix} \quad (181)$$

In this case, linear perturbations have been taken about each of the aerodynamic moments similar to the process used to calculate $\delta C_L$.

Using the perturbations defined, a new dynamical system may be defined of the standard EKF form presented previously. Consider the case where the effects of $\dot{\alpha} \approx 0$. In this case for a given state composed of the following elements:

$$x = \begin{bmatrix} \bar{P}^E \\ \bar{V}_B^E \\ \bar{Q}_B^E \\ \bar{\omega}_{IB}^B \\ \bar{V}_A^B \end{bmatrix} \quad (182)$$

At each time step, the commands for the actuators may be provided. The state is propagated forward in time (or to the current time step) using the following nonlinear propagation.

$$\dot{x} = \begin{bmatrix} \dot{\bar{P}}^E \\ \dot{\bar{V}}_B^E \\ \dot{\bar{Q}}_B^E \\ \dot{\bar{\omega}}_{IB}^B \\ \dot{\bar{V}}_A^B \end{bmatrix} = \begin{bmatrix} \bar{V}^E \\ \bar{g}^E + \frac{1}{m} C_B^E \bar{F}_{Aero}^B - [\omega_{IE}^E \times][\omega_{IE}^E \times]\bar{P}^E - 2[\omega_{IE}^E \times]\bar{V}^E \\ \frac{1}{2}\begin{bmatrix} 0 & -\bar{p} & -\bar{q} & -\bar{r} \\ \bar{p} & 0 & \bar{r} & -\bar{q} \\ \bar{q} & -\bar{r} & 0 & \bar{p} \\ \bar{r} & \bar{q} & -\bar{p} & 0 \end{bmatrix} \bar{Q}_B^E \\ (I_{BB}^B)^{-1}\left(+\bar{M}_{Aero}^B - l_{cg} \times m\bar{g}^E - ([\bar{\omega}_{IB}^B \times]I_{BB}^B \bar{\omega}_{IB}^B)\right) \\ 0 \end{bmatrix} \quad (183)$$

$$\bar{\omega}_{EB}^B = \begin{bmatrix} \bar{p} \\ \bar{q} \\ \bar{r} \end{bmatrix} = \bar{\omega}_{IB}^B - C_E^B \omega_{IE}^E \quad (184)$$

When pressure measurements are available, the above nonlinear dynamics may be perturbed around the state estimate in order to form the EKF state dynamics of the form:

$$\delta\dot{x} = A\delta x + Bw \quad (185)$$

In this way, the dynamics may be utilized to provide EKF dynamics which may be processed using the pressure and temperature measurement model defined in equation number 110 and the processing proceeds as before. Note that it is trivial to replace the ECEF position state $P^E$ with the altitude state $\delta h$ so that the EKF filter does not diverge due to lack of measurements. In this case equation number 186 represents the rotation from the ECEF frame to the local tangent frame which assumes some assumed location. However, this matrix changes slowly over time and it would be possible to either estimate the rotation based on the uncorrected values for $\bar{P}^E$ generated through the nonlinear propagation in time from the corrected state $\bar{V}^E$.

$$\delta h = [0 \ 0 \ 1] C_E^T \delta P^E \quad (186)$$

In this way, a relationship may be derived that relates the vehicle aerodynamic properties as well as the vehicle control system actuators to the forces and moments exerted on the vehicle.

The above may be augmented by adding back the disturbance forces or thrusting forces as available. Thrusting forces would provide both a moment and a force term. Disturbance forces would be located at a particular point on the vehicle.

This method may be further enhanced by including angular rate gyros as measurements into the system. The angular rate gyros provide direct measurements of $\omega_{IB}^B$ and could be used to help correct the attitude. The measurement model takes the form of equation number 187 with the value of $v_\omega$ representing noise.

$$\tilde{\omega}_{IB}^B = \bar{\omega}_{IB}^B + [\bar{\omega}_{IB}^B \times]\delta q + \delta\omega + v_\omega \quad (187)$$

Finally, the forces and moments could be replaced by simply utilizing the IMU as the inputs for acceleration and angular rate and utilizing the pressure sensors to correct the position, velocity, and attitude. In this case, the EKF takes a standard strap down equations of motion format. The nonlinear dynamics take the form:

$$\dot{x} = \begin{bmatrix} \dot{\bar{P}}^E \\ \dot{\bar{V}}_B^E \\ \dot{\bar{Q}}_B^E \\ \dot{\bar{V}}_A^B \end{bmatrix} = \begin{bmatrix} \bar{V} \\ \bar{g}^E + C_B^E \bar{F}_{Acc}^B - [\omega_{IE}^E \times][\omega_{IE}^E \times]\bar{P}^E - 2[\omega_{IE}^E \times]\bar{V}^E \\ \frac{1}{2}\begin{bmatrix} 0 & -\bar{p} & -\bar{q} & -\bar{r} \\ \bar{p} & 0 & \bar{r} & -\bar{q} \\ \bar{q} & -\bar{r} & 0 & -\bar{p} \\ \bar{r} & \bar{q} & -\bar{p} & 0 \end{bmatrix} \bar{Q}_B^E \\ 0 \end{bmatrix} \quad (188)$$

$$\bar{\omega}_{EB}^B = \begin{bmatrix} \bar{p} \\ \bar{q} \\ \bar{r} \end{bmatrix} = \bar{\omega}_{IB}^B - C_E^B \omega_{IE}^E \quad (189)$$

These nonlinear dynamics are propagated using the acceleration and angular rate measurements as the inputs. For acceleration measurement, $F_{Acc}^B = \tilde{\alpha}^B$ and for angular velocity measurements, $\bar{\omega}_{IB}^B = \tilde{\omega}_{IB}^B$ where $\tilde{\alpha}^B$ are the acceleration outputs of the IMU and $\tilde{\omega}_{IB}^B$ are the angular rate outputs.

The linearized error dynamics take the form:

$$\delta \dot{x} = \begin{bmatrix} \delta \dot{h} \\ \delta \dot{V}_B^E \\ \delta \dot{q} \\ \delta \dot{\omega}_{IB}^B \\ \delta \dot{a}^B \\ \delta \dot{V}_A^B \end{bmatrix} = \begin{bmatrix} 0 & [0\ 0\ 1]C_E^T & 0 & 0 & 0 & 0 \\ \left(\frac{\partial g^E}{\partial P^E} - [\omega_{IE}^E \times][\omega_{IE}^E \times]\right)C_T^E\begin{bmatrix}0\\0\\1\end{bmatrix} & -2[\omega_{IE}^E \times] & -2C_B^E[\overline{F}_{Acc}^B \times] & C_B^E & 0 & 0 \\ 0 & 0 & -[\overline{\omega}_{EB}^B \times] & \frac{1}{2}I & 0 & 0 \\ 0 & 0 & 0 & \frac{-1}{\tau_\omega}I & 0 & 0 \\ 0 & 0 & 0 & 0 & \frac{-1}{\tau_a}I & 0 \\ 0 & 0 & 0 & 0 & 0 & 0 \end{bmatrix} \quad (190)$$

$$\begin{bmatrix} \delta h \\ \delta V_B^E \\ \delta q \\ \delta \omega_{IB}^B \\ \delta a^B \\ \delta V_A^B \end{bmatrix} + \begin{bmatrix} 0 & 0 & 0 & 0 & 0 \\ C_B^E & 0 & 0 & 0 & 0 \\ 0 & \frac{1}{2}I & 0 & 0 & 0 \\ 0 & 0 & I & 0 & 0 \\ 0 & 0 & 0 & I & 0 \\ 0 & 0 & 0 & 0 & I \end{bmatrix} \begin{bmatrix} w_v \\ w_q \\ w_\omega \\ w_a \\ w_g \end{bmatrix}$$

In this case the terms $\delta \omega_{IB}^B$ and $\delta \alpha^B$ represent errors in the IMU angular rates and accelerometers, respectively. The terms $\tau_\omega$ and $\tau_\alpha$ represent correlation times for these bias errors. The noise terms are all zero mean, Gaussians that are uncorrelated with each other. Each noise term represents a type of noise either associated with the IMU ($w_v$, $w_q$, $w_\alpha$, $ww_\omega$) or with the wind disturbances ($w_g$).

These dynamics may replace the EKF dynamics defined for the pressure sensor EKF in equation number 103 and the EKF proceeds as before.

In both cases where the IMU or the vehicle aerodynamics may be utilized, the altitude position will be stabilized, but the lateral position error may grow. However, this is not important for the present case. If absolute position is required, then a GPS receiver may be utilized to provide position measurements as described in the next section. Fault detection of failures in the accelerometers may be detected by having more than one accelerometer set on the drogue and using projectors to compare the residuals based on the anticipated accelerations derived by the vehicle model and command inputs. Each hypothesized failure residual may then be passed through a MHSSPRT to detect and isolate the failure.

Figure 9:
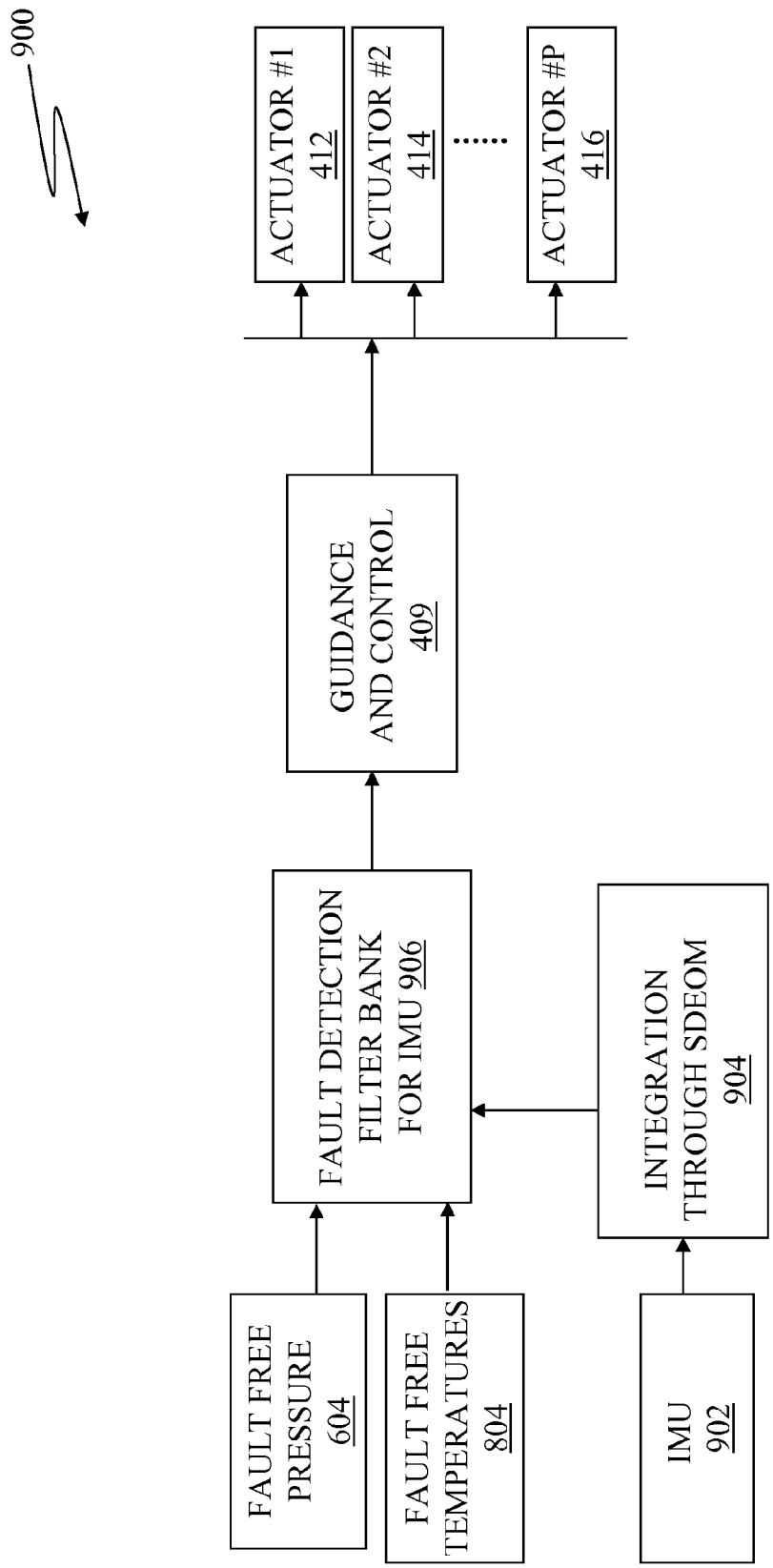
FIG. 9 shows a block diagram of an exemplary fault detection filter structure with inertial navigation.
Figure 10:
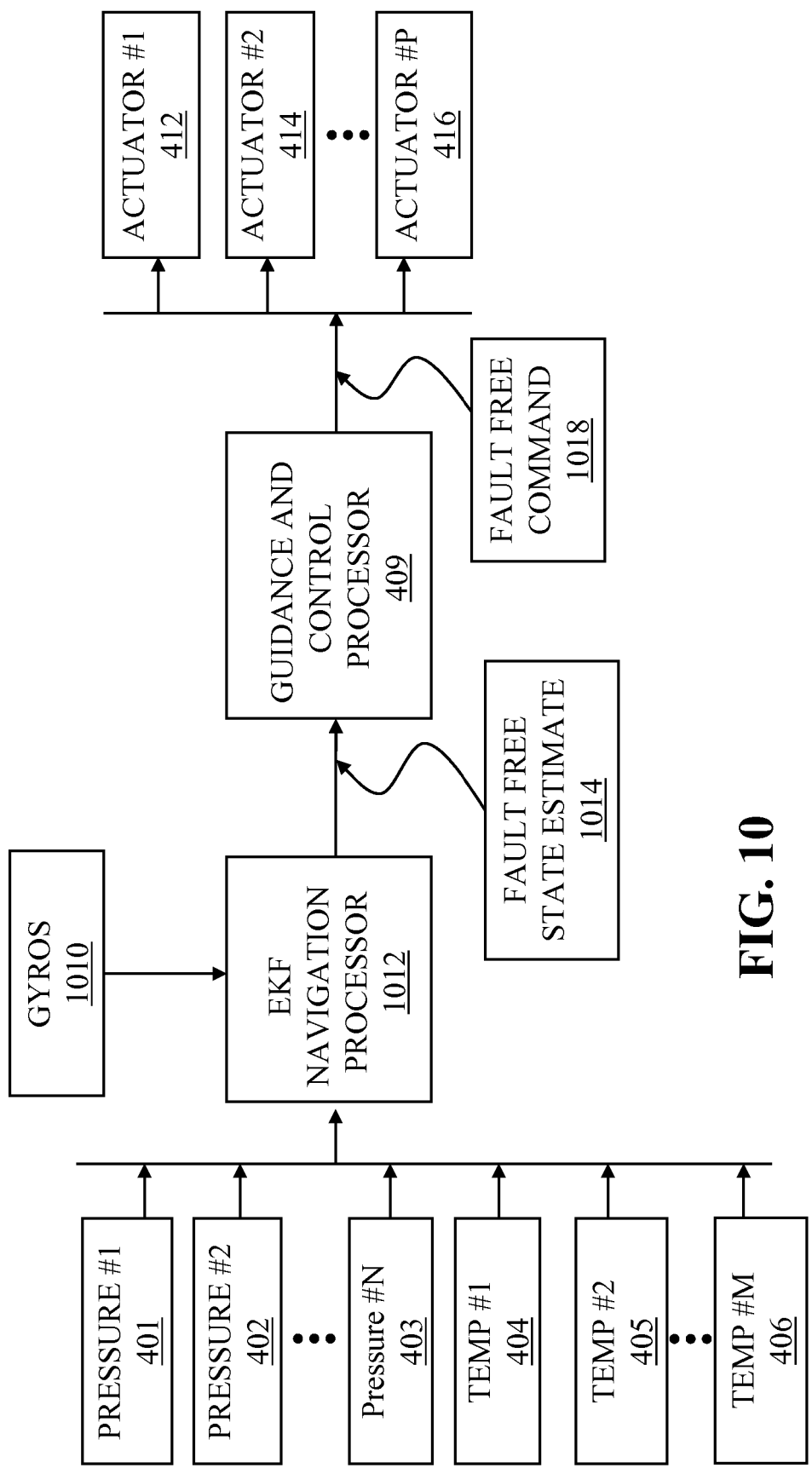
FIG. 10 shows a block diagram of feedback configuration with gyros.
Figure 11:
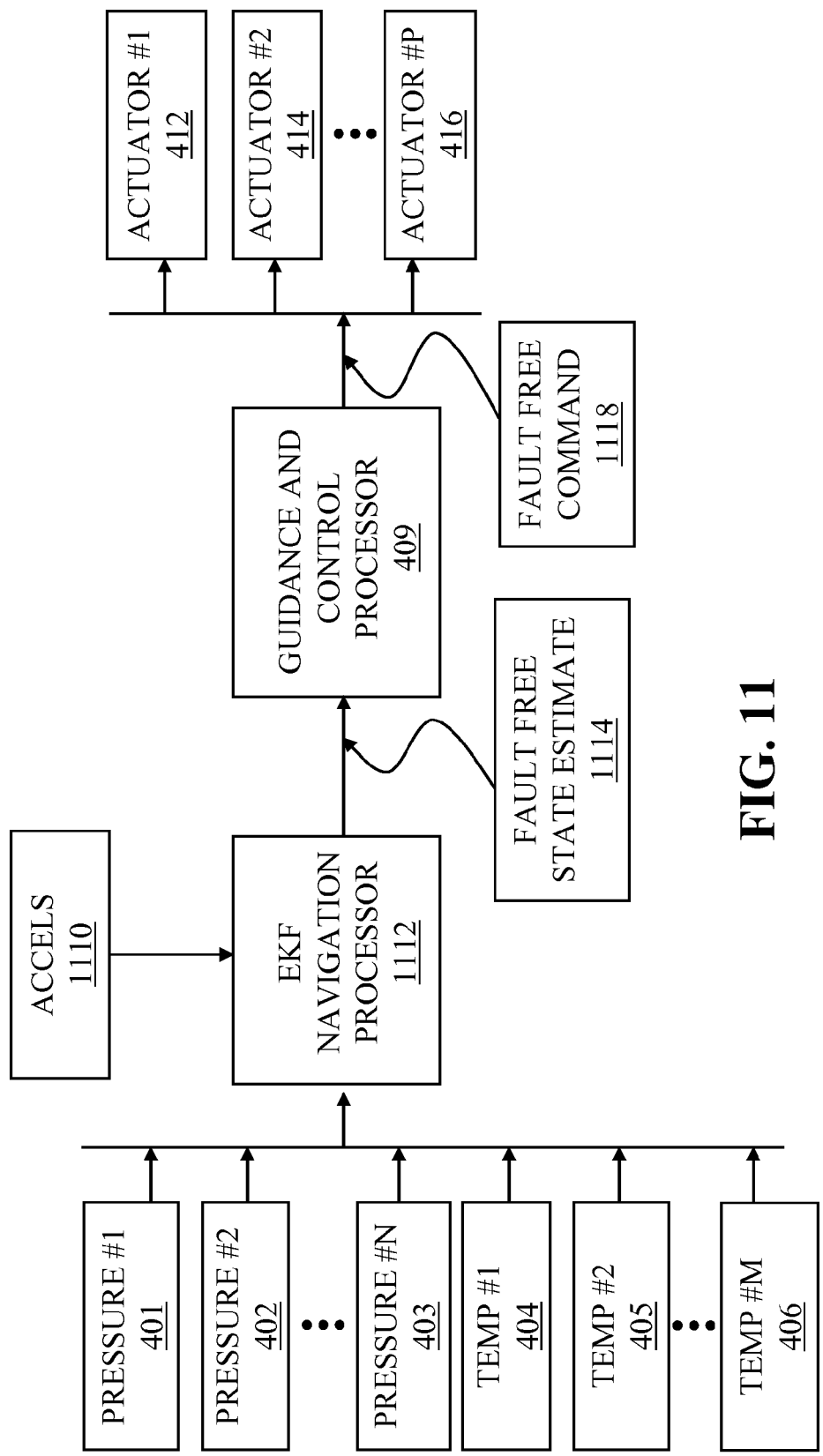
FIG. 11 shows a block diagram of feedback configuration with accelerometers.
Figure 12:
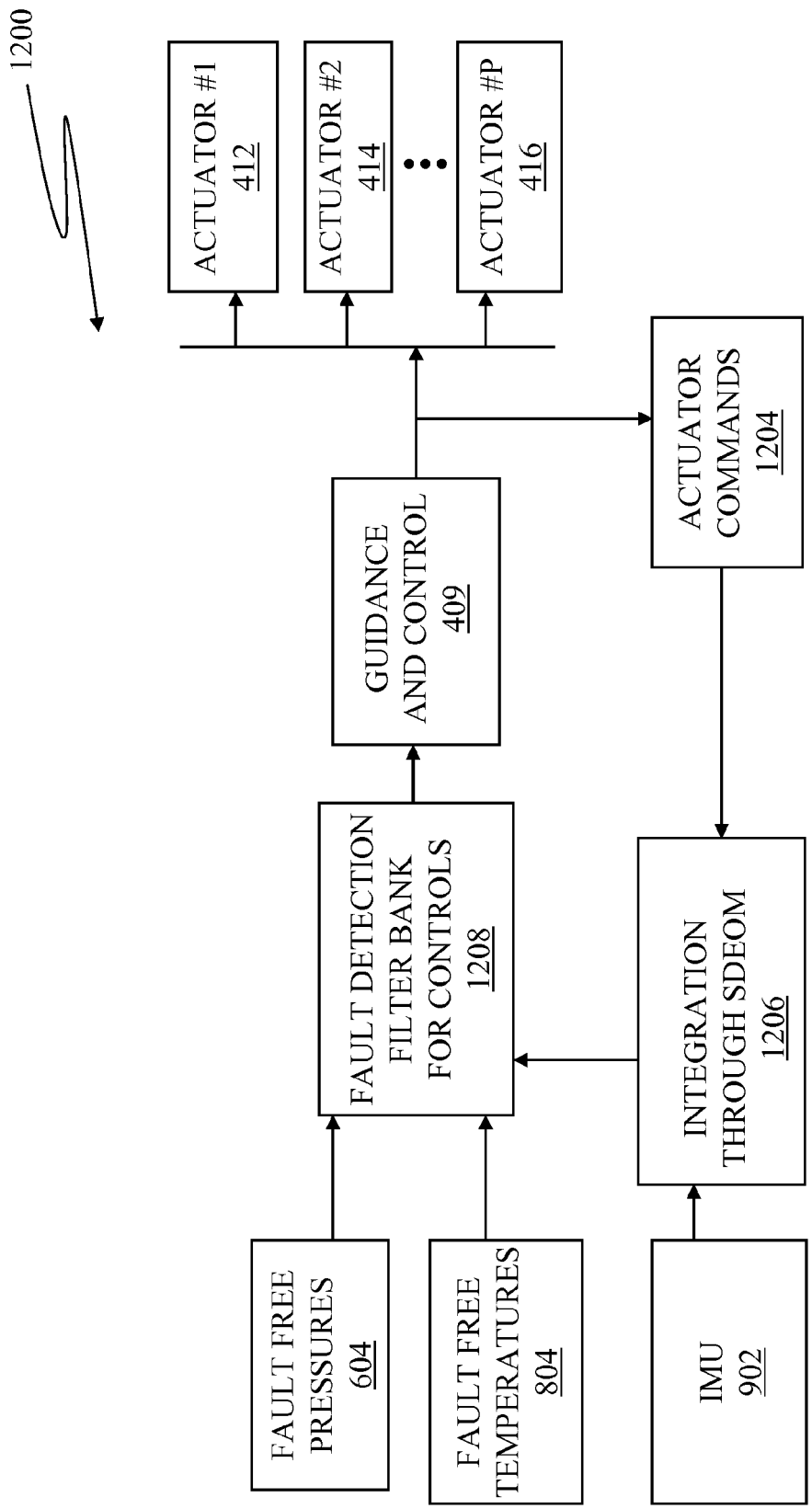
FIG. 12 shows a block diagram of an exemplary fault detection filter structure with actuator feedback.

The fundamental process is depicted in block diagram form 900 in FIG. 9. In this figure, the IMU 902 is utilized to provide acceleration and angular rate measurements to the EKF navigation processors which consist of integrating 904 the accelerations and angular rates to form the navigation state fault detection filter bank 906 which is corrected by the pressure 604 and temperature measurements 804. Limited versions are depicted in FIG. 10 in which only gyro measurements 1010 are available. FIG. 11 shows the case where only accelerometers 1110 are available. A complete system 1200 in which both the IMU 902 and the actuator commands 1204 and IMU 902 are utilized to generate the resulting forces and moments and then corrected through the EKF 1208 are presented in FIG. 12.

Accelerometer failures may also be detected using fault detection filter structures which may be variations on the Extended Kalman Filter proposed in which a fault direction is introduced into the filter and effectively blocked. A MHSSPRT or Chi-Square test can be utilized to detect and isolate failures to a particular accelerometer axis. Gyro failures may be detected using the same methods of using a fault detection filter structure to detect and isolate gyro failures. Residual testing through the MHSSPRT may result in the calculation of the probability that a failure in the gyro has occurred.

2.6 Additional GPS Measurements

Figure 13:
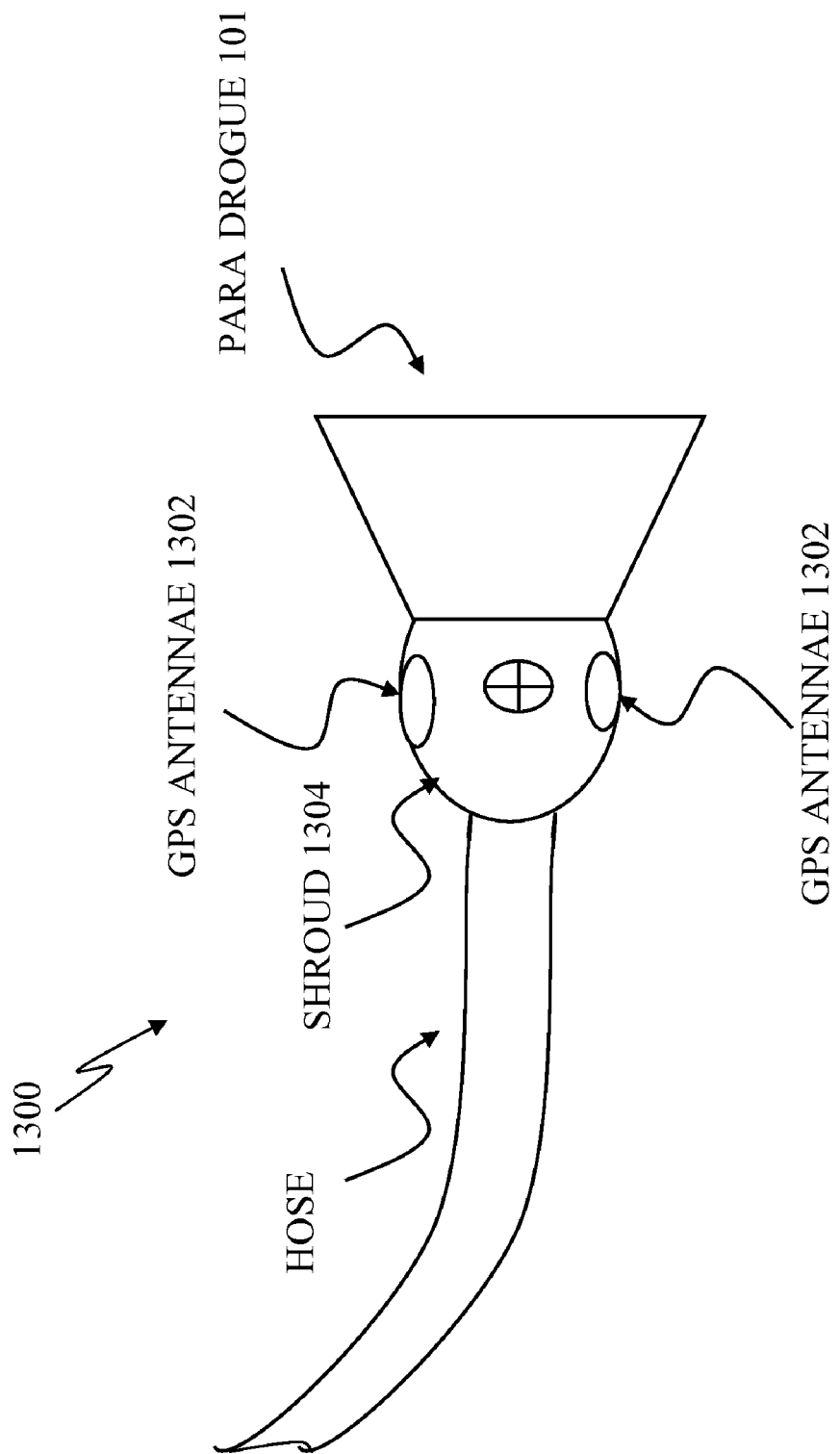
FIG. 13 shows an example of a multi-GPS antenna configuration.
Figure 14:
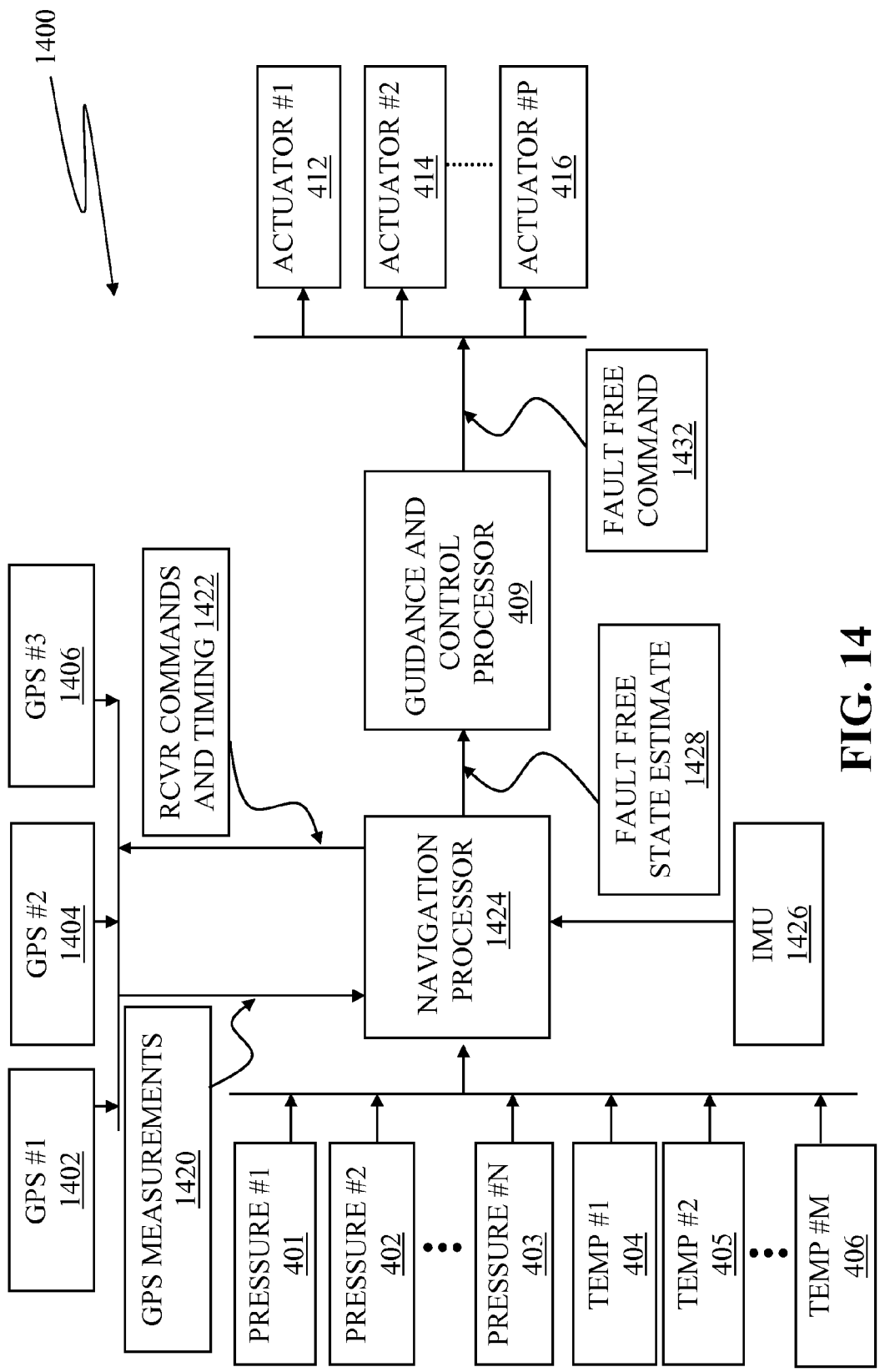
FIG. 14 shows a block diagram of a feedback configuration with multiple GPS receivers.

The estimate may be further enhanced by employing multiple GPS receivers. FIG. 13 shows the configuration in which multiple GPS antennae 1302 are placed on the shroud 1304 and located a fixed, known distance from the center of the drogue 1300. Each receiver may be orientated in such a way as to provide a partial view of the sky. In this way, if the body rotates so that one antenna is obscured, then another antenna may be there to continue receiving Global Positioning System (GPS) signals. The GPS measurements would provide range, range rate, and carrier phase measurements which may be blended with the inertial data or the vehicle model data to produce a best estimate of the drogue position, velocity, attitude and attitude rate. FIG. 14 shows the use of the GPS in block diagram format 1400. The multiple GPS receivers 1402, 1404, 1406 are synchronized together through a common time reference so that only a single clock bias is required from each. The temperature 404, 405, 406 and pressure measurements 401, 402, 403 are combined with the GPS measurements 1420 through an EKF. The state space is similar to the navigation state space defined and the GPS measurements provide the standard corrections similar to a GPS/INS EKF defined in the literature. The IMU 1426 is utilized to propagate the state from time step to time step. The output 1428 of this filter structure 1424 is passed to the control system 409 to provide a command 1432 to the actuators 412, 414, 416.

Two examples of exemplary systems are described herewith. A single GPS receiver may receive radio signals from multiple antennae around the circumference of the drogue. In this way, at least one antenna would have a clear view of the sky. However, the signals may be smeared together with energy received at other antennae resulting in a less precise estimate. The second option may be to utilize one receiver for each antenna. A third option may be to use one RF front end to receive the energy from one antenna. A set of tracking loops may be dedicated to each RF front end in order to track the available satellites visible from that antenna. A single baseband processor may take the integrated in phase and quadrature (I's and Q's) and process it into a single estimate of the code and carrier replica to be fed back to each RF front end tracking loop set. In this way, a single receiver may track satellites on multiple antennae ensuring that as the drogue rotates, the tracking loops update appropriately to ensure that satellite measurement remains visible and available for navigation process despite transitions in observability of the drogue GPS antennae.

The true winds may then be estimated by removing the inertial portion of the velocity component. The GPS/INS sensor fusion process estimates $V_B^{NED}$, and the air speed estimation process defined in the previous section may be utilized to estimate the relative air speed velocity $V_{AB}^{NED}$. The true wind states are therefore:

$$V_A^{NED} = V_{AB}^{NED} + V_B^{NED} \qquad (191)$$

The GPS may be used to correct the inertial navigation system for errors in position, velocity, attitude as well as provide an on-line calibration of the accelerometer and gyro bias errors. Fault detection on the GPS receiver may be accomplished by comparing the outputs of different position estimates from different subsets of GPS measurements in a least squares sense similar to the method presented for pressure transducer fault detection. A MHSSPRT may be used to detect the probability of a failure.

2.7 Image Processing Relative to Other Vehicles

The above processing may be further enhanced by using an Electro-Optical image processing system to provide estimates of position, velocity, and attitude relative to some other vehicle. The EO sensors provide a measurement of range, range rate, or bearings measurements from the body to the other vehicle or obstacle. The EO sensor would provide information about the range and attitude of the body relative to the other vehicle which could be utilized for feedback purposes.

Figure 15:
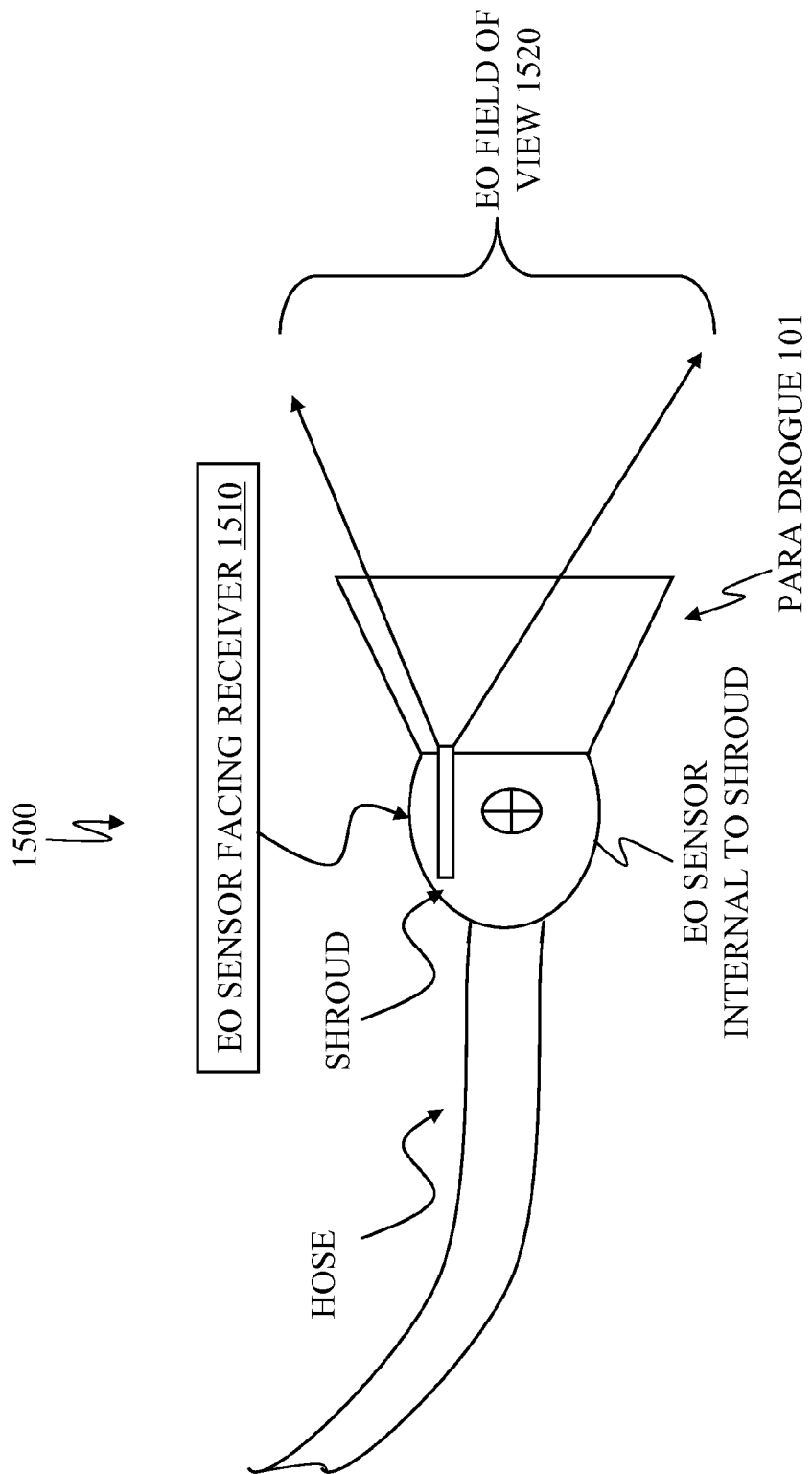
FIG. 15 shows an example of an electro optical configuration.
Figure 16:
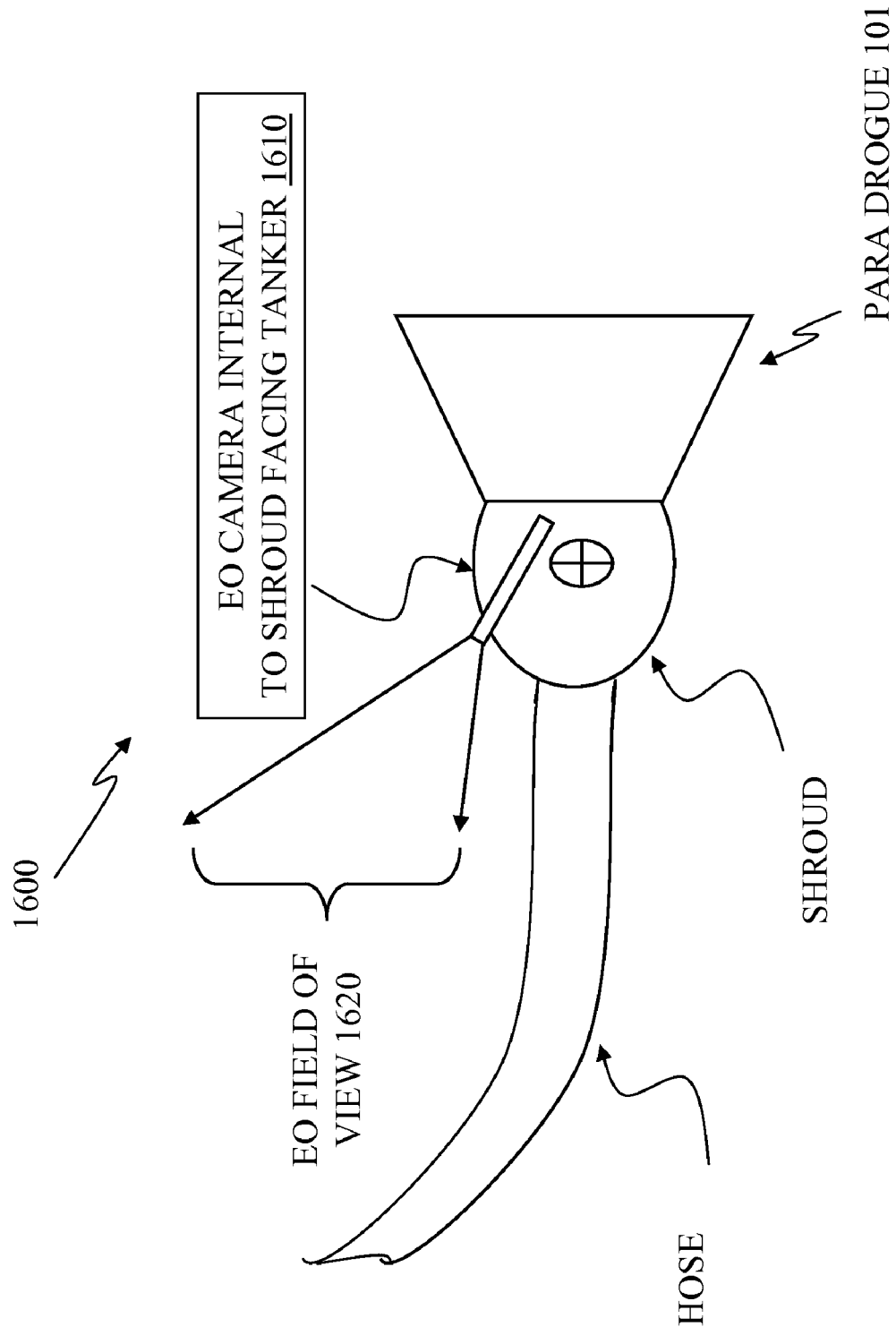
FIG. 16 shows an example of an electro optical configuration.
Figure 17:
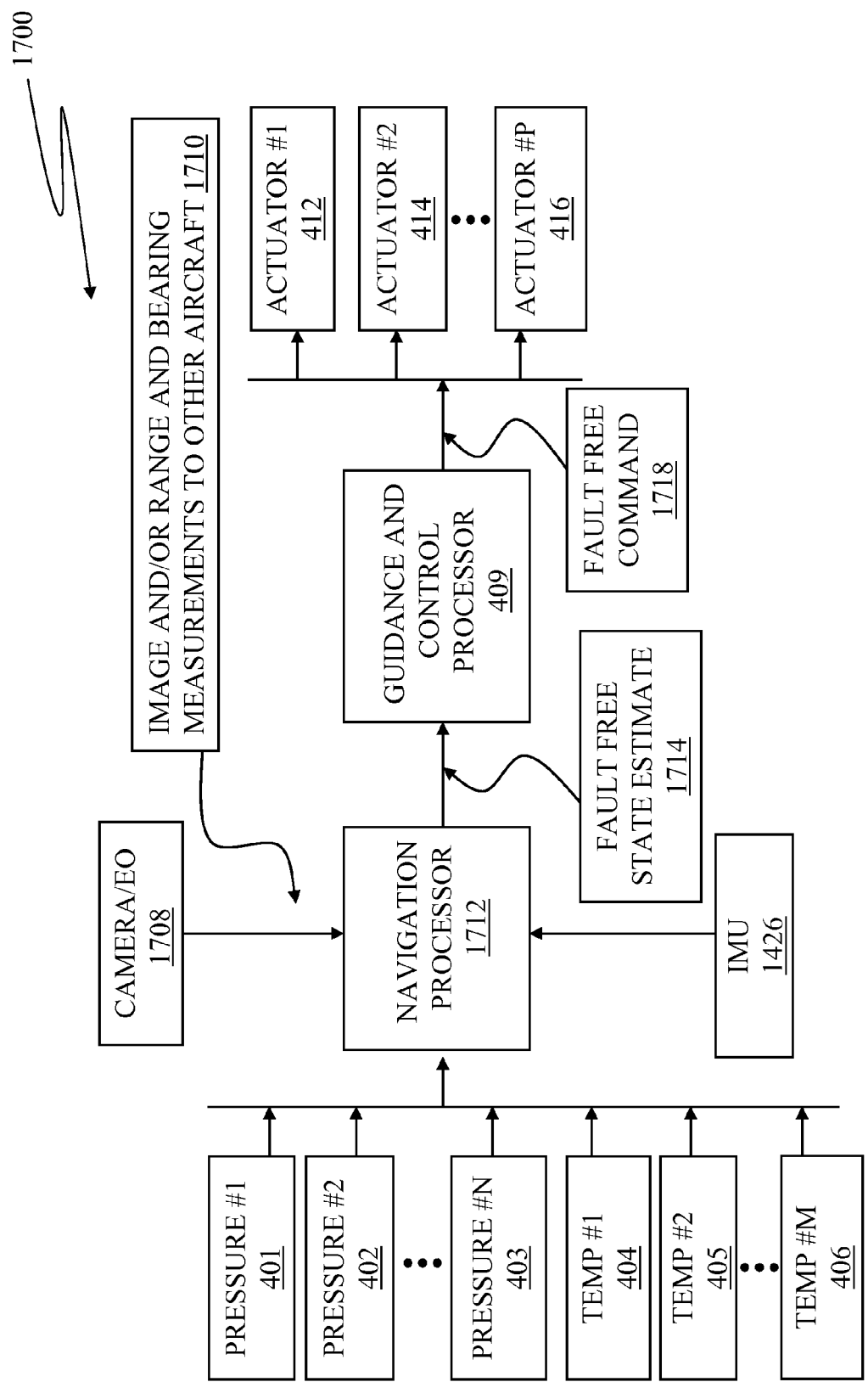
FIG. 17 shows a block diagram of feedback configuration with electro optical sensors.

FIG. 15 shows a configuration in which an EO sensor faces 1510 through the drogue 1500 to view 1520 an approaching receiver. FIG. 16 shows a drogue configuration 1600 in which an imaging sensor is positioned to face the tanker 1610. FIG. 17 shows the feedback control system 1700 in which the state may be augmented with the relative state between the drogue and the other vehicle 1710, whichever may be viewed via camera/EO device 1708. The estimate of relative position and attitude are fed to the control system 409 and the control system provides feedback to attempt to minimize the relative attitude or the relative position, for this example. For instance, the drogue may choose to control such that the drogue aligns itself in both roll and pitch with an oncoming aerial refueling probe as well as attempts to reduce the vertical or lateral offset for the probe.

Figure 18:
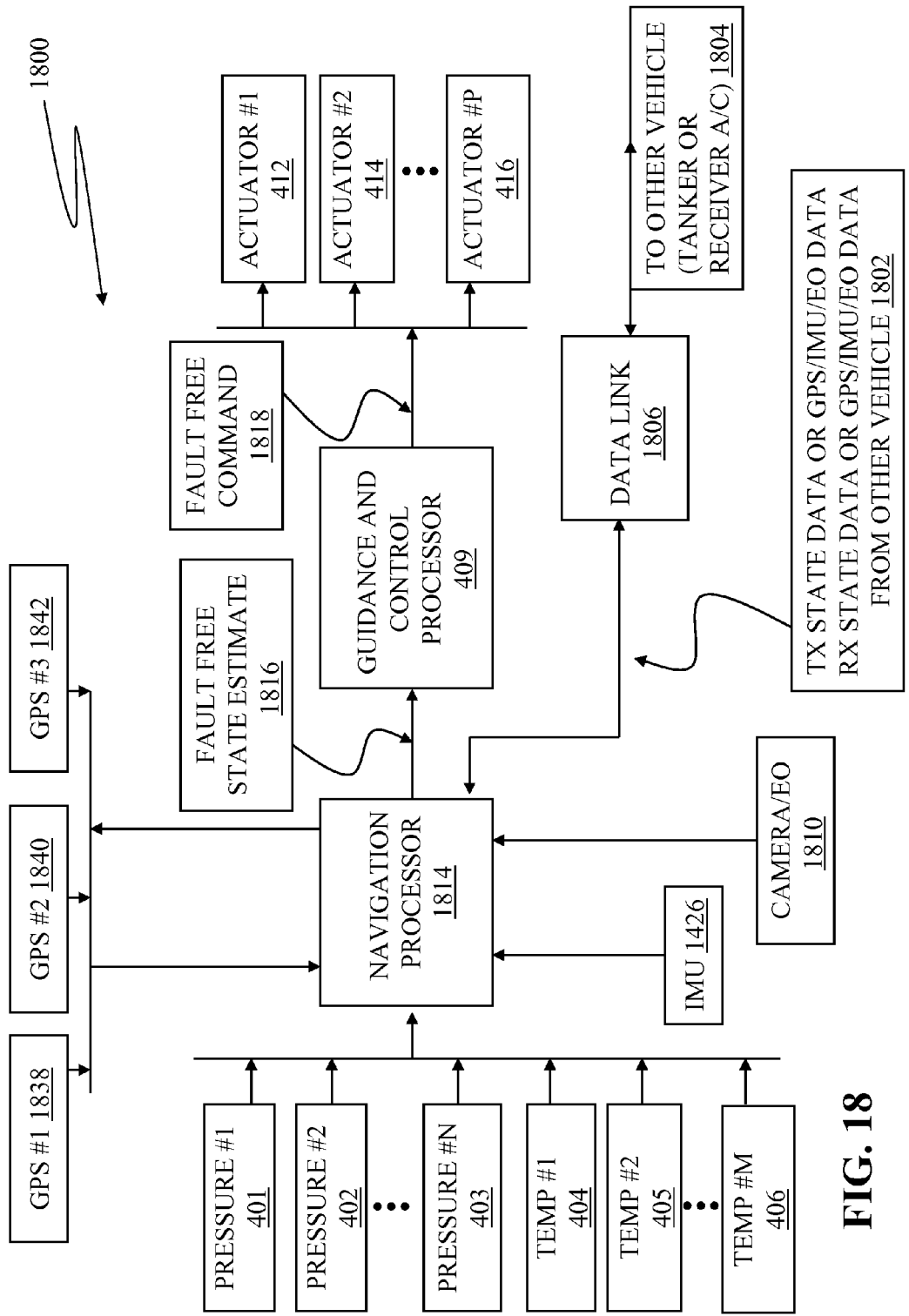
FIG. 18 shows a block diagram of feedback complete configuration.

FIG. 18 shows a detailed system block diagram 1800 in which all of the measurements 1802 may be combined and processed including information provided by the other vehicle 1804 through a data link 1806. In this case the full navigation state and relative navigation state may be estimated through a structure similar to the Global Extended Kalman filter in which both the drogue GPS receiver measurements and the relative vehicle GPS measurements may be utilized in a differential manner to estimate the relative position and attitude. The EO measurements 1810 augment this estimate with additional measurements of relative position and/or attitude. The raw measurements may be transmitted out of the data link 1806 back to the other vehicle 1804 in order to enable the other vehicle to steer towards the drogue while the drogue attempts to steer towards the other vehicle.

3.0 Feedback

The preceding example presented a means of navigation relative to air mass motion. A simple feedback control system may be employed, such that the body maintains a desired angle of attack and sideslip.

3.1 Air Data Feedback.

Given an air vehicle with active, aerodynamic control, the forces and moments acting on the vehicle are usually a function of the flight condition, angle of attack and sideslip, as well as the control surface deflection. In equation number 192, the summation of forces F acting on the body (neglecting Earth related effects) are equal to the body mass m multiplied by the acceleration vector A. The summation of forces are typically a function $f_A$ of the Mach number, angle of attack, sideslip, and command inputs $\delta u$.

$$\Sigma F = mA = f_A(M, \alpha, \beta, \delta u) \qquad (192)$$

Likewise, the summation of moments is defined in equation number 193 as the multiplication of the vehicle inertial tensor $I_{BB}^B$ and the angular acceleration $\dot{\omega}_{IB}^B$ of the body with respect to the inertial in the body frame.

$$\Sigma M = I_{BB}^B \dot{\omega}_{IB}^B = f_M(M, \alpha, \beta, \delta u) \qquad (193)$$

Given the models for the forces and moments, and given sufficient control authority in the control $\delta u$, a regulator may be constructed to maintain a desired angle of attack and sideslip using fault free estimates derived in the previous section. A control system may be derived to drive the angle of attack and sideslip to zero. A typical quadratic cost function that may be used is:

$$\min_{\delta u} J = \int_{t=0}^{t=\infty} \delta x_c^T S^{-1} \delta x + \delta u^T R^{-1} \delta u \, dt \qquad (194)$$

In which case S>0 is a positive definite weighting matrix on the state and R≥0 is a positive semi-definite weighting matrix on the control. The goal is to define the control $\delta u$ needed to drive the state $\delta x_c$ to zero with the state defined in equation number 195 in which $\alpha_c$ and $\beta_c$ are the commanded angle of attack and sideslip and $\hat{\alpha}$ and $\hat{\beta}$ are the estimates of angle of attack and sideslip provided by the estimators of the previous section.

$$\delta x_c = \begin{bmatrix} \alpha_c - \hat{\alpha} \\ \beta_c - \hat{\beta} \end{bmatrix} \qquad (195)$$

Any number of regulator designs may be determined to satisfy equation number 194 including developing an LQR or LQG type of control law by linearizing the dynamics around the nominal and then defining a feedback matrix K used to calculate the commands based on the current state estimate. Simpler methods may be utilized as well such as simple proportional control, proportional-integral (PI) or proportional-integral-derivative (PID). If altitude is estimated using the Extended Kalman Filter, then altitude may be added to the state, as well as, pitch and roll. The control system could be utilized to stabilize the altitude, rate of change of altitude or to adjust the orientation of the drogue. Finally, given knowledge of the forces and moments, it may be possible to program maneuvers which will enhance the observability of the filter.

3.2 Aero and Inertial Feedback

If angular velocity is added to the state space, it may be possible to derive an additional control system that will stabilize not only the angle of attack and sideslip but also minimize the inertial angular rates. If full GPS data is available, a control law may be constructed to hold position, velocity, and/or attitude to the limits of the control system.

3.3 Relative Navigation

If information about the towing vehicle or another vehicle approaching the drogue is available either through EO or differential GPS or other means, a control law may be constructed to control position and attitude relative to one or the other vehicle. The blocking filter used for missile dynamics may make an excellent rendezvous control law since it blocks uncertainties in the relative states that may not be estimated well or controlled well with the current control system.

3.4 Fault Detection of Control Surfaces

Given knowledge of the aerodynamic models, it may be possible to derive fault detectors for estimating the health and responsiveness of the actuators. First, a set of accelerometers may be distributed around the circumference of the drogue. The accelerometers would sense the forces and moments generated by each actuator and compare the measured acceleration to the predicted acceleration using the vehicle model. If sufficient accelerometers exist and if there is sufficient geometry, a projector may be constructed to eliminate the effect of one actuator on all of the acceleration measurements. When compared to other hypothesized actuator failures, where each of the hypothesized failures are projected values, a residual with a projected actuator should be zero mean when the actuator fails while other residuals may not be enabling fault detection and isolation of the actuator that has failed. A MHSSPRT may be utilized to estimate the probability of the failure in the actuator.

Figure 19:
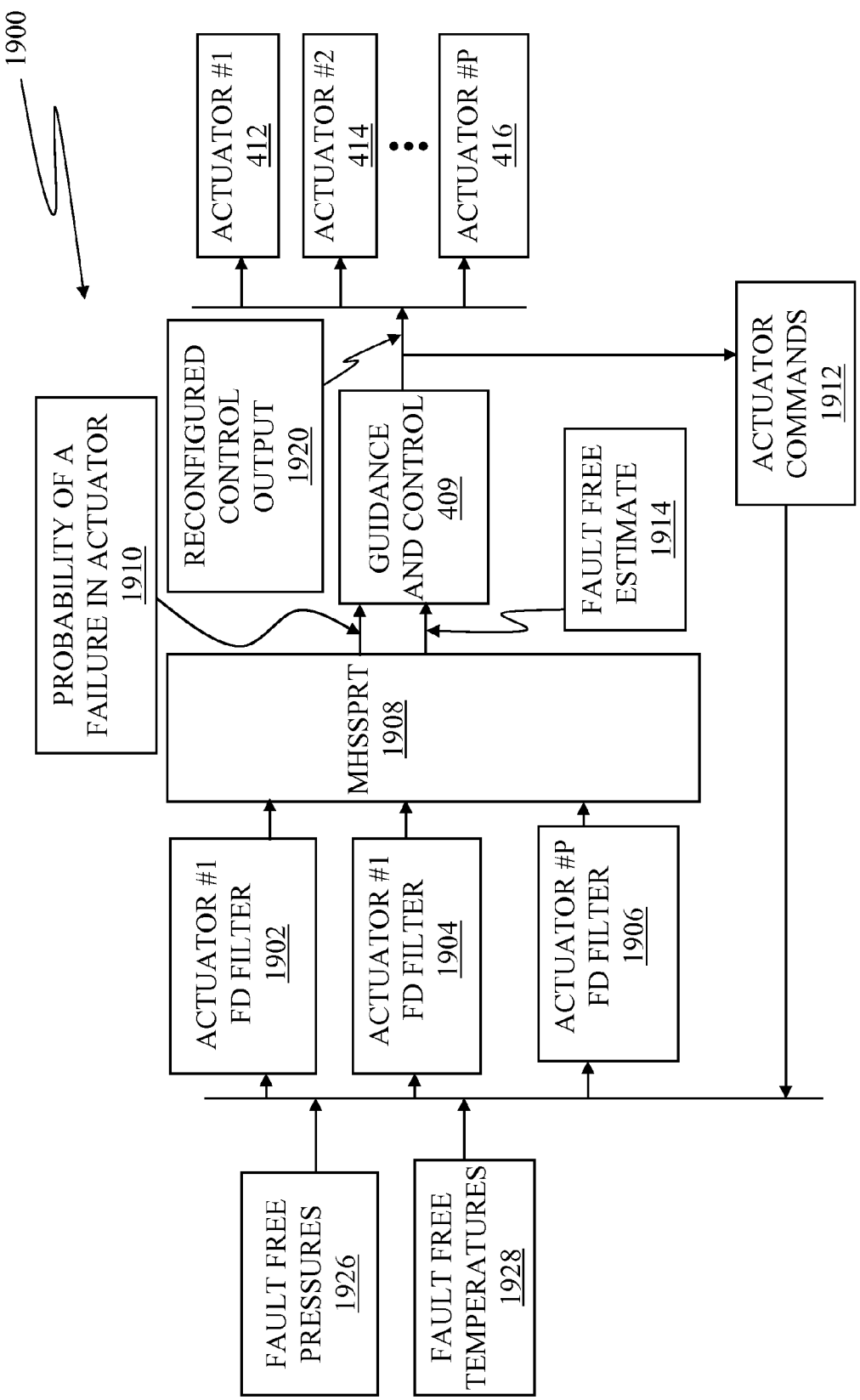
FIG. 19 shows a block diagram of a fault detection filter structure.

A second method 1900 is depicted in FIG. 19 and consists of the process of utilizing fault detection filters 1902, 1904, 1906 which are Kalman Filter like, except that a fault direction may be hypothesized and blocked within the Kalman Filter process. A bank of filters, each tuned to block one actuator fault may be utilized to generate residuals. A MHSSPRT may be utilized to estimate the probability of the failure in an actuator. These filters may be augmented with inertial data, if available, or GPS data, or EO data.

4.0 Additional Examples

4.1 Aerial Refueling Drogue

An aerial refueling drogue may be configured with the pressure sensors on the outside of the bell housing so as to provide estimates of air speed, angle of attack, or sideslip relative to air mass motion. If an active control system is available such as aerodynamic control surfaces or by manipulation of the drogue canopy, the estimates of orientation may be used to provide feedback control to the canopy and steer the drogue in the direction of wind mass and therefore reduce the motion of the drogue in the presence of disturbances or compensate for motion induced by an approaching aircraft or a mild collision caused by a missed attempt at refueling.

4.2 Air Speed Sensor

Air speed is sometimes measured by dragging a parachute or a conic device behind an aircraft or boat. Pressure sensors on the device may be utilized to estimate the air speed of the vehicle. In this case, the additional pressure sensors may help estimate angle of attack and sideslip in order to improve the estimates of air speed and provide corrections to an aerodynamic control system on the device so that the device maintains orientation with respect to air mass motion even in the presence of gusts in order to maximize the accuracy of the air data measurements.

4.3 Parachute

The methodology may be ideally suited for a falling parachute in which a sensing device with the pressure sensors and known aerodynamics may be coupled to a parachute in order to ensure that the parachute maintains the desired angle of attack and sideslip.

4.4 Sonar Buoy

A sonar buoy may be outfitted with the device and used to maintain the sonar buoy in the correction orientation as it is pulled behind a water vessel.

What is claimed is:

1. A process for control of a drogue relative to fluid motion comprising:
    measuring, based on the output of at least one pressure sensor, fluid pressure at a plurality of stations disposed about the drogue;
    estimating, by a computing device, the drogue orientation relative to an air mass motion based on the output of the at least one pressure sensor;
    generating a feedback command for regulating the drogue orientation relative to air mass motion;
    actuating at least one orientation control device based on the generated feedback command; and
    estimating the probability of failure of the at least one orientation control device.

2. The process of claim 1 further comprising the computing device:
    estimating a health status for at least one pressure sensor,
    processing a measurement output of the at least one pressure sensor based on a plurality of portals; and
    estimating a probability of a failure for at least one pressure sensor.

3. The process of claim 1 further comprising the computing device:
    inputting accelerometer measurements;
    projecting the accelerometer measurements into an estimated drogue state; and
    testing for accelerometer failure based on a Multiple Hypothesis Shiryayev Sequential Probability Ratio Test (MHSSPRT).

4. The process of claim 1 further comprising the computing device:
    inputting accelerometer measurements;
    projecting the accelerometer measurements into an estimated drogue state; and
    testing for accelerometer failure based on a Chi-Square Test.

5. The process of claim 1 wherein the processing further comprises one or more fault detection filter instruction sets, wherein at least one fault detection instruction set is coupled with a statistical projector instruction set; and wherein a sensor fault detection estimation is based on a Multiple Hypothesis Shiryayev Sequential Probability Ratio Test (MHSSPRT).

6. The process of claim 1 wherein the processing further comprises one or more fault detection filter instruction sets, wherein at least one fault detection instruction set is coupled with a statistical projector instruction set; and wherein a sensor fault detection estimation is based on a Chi-Square Test.

7. A system for controlling a drogue relative to fluid motion comprising:

at least one pressure sensor and a plurality of ports disposed about the surface of the drogue;

at least one control actuating device adapted to generate rotational forces about the drogue;

circuitry providing communication between the at least one pressure sensor and the at least one control actuating device to a computing device; and the computing device comprising a central processing unit and addressable memory, the computing device configured to:
estimate an orientation of the drogue relative to an air mass motion based on measurement output of the at least one pressure sensor;
generate a feedback command for the at least one control actuating device for regulating the drogue orientation relative to air mass motion based on measurement output of the at least one pressure sensor, and
estimate a probability of failure of the at least one control actuating device.

8. The system of claim 7 wherein the computing device is further configured to:
estimate a health status for at least one pressure sensor,
process a measurement output of the at least one pressure sensor based on a plurality of portals; and
estimate a probability of a failure for at least one pressure sensor.

9. The system of claim 7 wherein the computing device is further configured to:
input accelerometer measurements;
project the accelerometer measurements into an estimated drogue state; and
test for accelerometer failure based on a Multiple Hypothesis Shiryayev Sequential Probability Ratio Test (MH-SSPRT).

10. The system of claim 7 wherein the computing device is further configured to:
input accelerometer measurements;
project the accelerometer measurements into an estimated drogue state; and
test for accelerometer failure based on a Chi-Square Test.

11. The system of claim 7 wherein the computing device is further configured to comprise one or more fault detection filter instruction sets, wherein at least one fault detection instruction set is coupled with a statistical projector instruction set; and wherein a sensor fault detection estimation is based on a Multiple Hypothesis Shiryayev Sequential Probability Ratio Test (MHSSPRT).

12. The system of claim 7 wherein the computing device is further configured to comprise one or more fault detection filter instruction sets, wherein at least one fault detection instruction set is coupled with a statistical projector instruction set; and wherein a sensor fault detection estimation is based on a Chi-Square Test.

* * * * *